United States Patent
Nozawa

(10) Patent No.: US 6,781,709 B2
(45) Date of Patent: Aug. 24, 2004

(54) APPARATUS FOR AND METHOD OF SETTING PRINTING-RELATED INFORMATION AND RECORDING MEDIUM TO ATTAIN THE SAME

(75) Inventor: Shinji Nozawa, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 94 days.

(21) Appl. No.: 09/733,904

(22) Filed: Dec. 12, 2000

(65) Prior Publication Data

US 2001/0005269 A1 Jun. 28, 2001

Related U.S. Application Data

(63) Continuation of application No. PCT/JP00/02395, filed on Apr. 12, 2000.

(30) Foreign Application Priority Data

Apr. 12, 1999 (JP) .......................................... 11-103634

(51) Int. Cl.[7] .......................... G06F 15/00; B65H 39/10
(52) U.S. Cl. ....................... 358/1.12; 358/1.1; 358/498; 271/288; 271/298
(58) Field of Search ............................. 358/1.12, 1.11, 358/1.13, 1.15, 1.1, 1.3, 1.9, 498; 710/8, 114, 19; 355/72; 709/229; 271/288, 298

(56) References Cited

U.S. PATENT DOCUMENTS 4,748,479 A * 5/1988 Ohira et al. .................. 355/72
5,832,298 A * 11/1998 Sanchez et al. ................ 710/8
5,956,035 A * 9/1999 Sciammarella et al. ..... 345/815
6,327,613 B1 * 12/2001 Goshey et al. .............. 709/208

FOREIGN PATENT DOCUMENTS

| JP | 6-4234 | 1/1994 |
| JP | 8-339274 | 12/1996 |

* cited by examiner

Primary Examiner—Twyler Lamb
(74) Attorney, Agent, or Firm—Oblon, Spivak, McClelland, Maier & Neustadt, P.C.

(57) ABSTRACT

A system which enhances the process of specifying the settings of paper input and paper output by a printer driver. The system causes a Properties dialog box to be displayed on a display. The dialog box includes an image, which is an icon schematically illustrating the appearance of a printer, a paper input settings display box showing information relating to paper input to the printer, and a paper output settings display box showing information relating to paper output from the printer to be displayed in a mutually correlating manner with indication lines. Namely, the system does not require the user to switch over the card when the user carries out both the settings of paper input and the settings of paper output. The paper input settings display box has radio buttons corresponding paper output sources. The user clicks one of the radio buttons to select a desired input paper source. The paper output settings display box has checkboxes corresponding to paper outputs. The user clicks one of the checkboxes to select a desired paper output.

26 Claims, 19 Drawing Sheets

APPARATUS FOR AND METHOD OF SETTING PRINTING-RELATED INFORMATION AND RECORDING MEDIUM TO ATTAIN THE SAME

CROSS REFERENCES TO RELATED APPLICATIONS

The present document claims priority on and is based on Continuation PCT/JP00/02395, filed on Apr. 12, 2000, and JP 11-103634, filed on Apr. 12, 1999, the entire contents of both of which are hereby incorporated herein by reference.

BACKGROUND OF THE INVENTION

1. Field of the Invention

The present invention relates to a technique of setting various pieces of information with regard to printing with a predetermined printing device, based on input data from an input unit according to the contents of a screen display area displayed for data input on a display unit.

2. Discussion of the Background

The software referred to as a printer driver and incorporated in a computer is generally required to cause a printer connecting with the computer to print computer-generated print data. The printer driver is a computer program that sets in the computer various pieces of information regarding the printer, for example, the functions of the printer, the interface, the font, and the control code, and controls the printer based on such information. A printer driver is provided for each model of the printer that carries out printing operations.

The user operates the computer to activate the printer driver incorporated in the computer, and causes a Properties dialog box to be displayed on a display. Various pieces of information can be set in this Properties dialog box; for example, information regarding the basic settings of printing such as the quality of printing and color correction, information regarding the settings of paper input such as selection of a feeder, and information regarding the settings of paper output such as selection of a destination of paper output. These various pieces of information are divided into a plurality of groups corresponding to their functions, for example, the basic settings, the settings of paper input, and the settings of paper output, and are classified in the form of separate cards or pop-up menu screens of a graphical user interface. The user selects a desired one among the plurality of cards for settings and inputs required data to set the information in the selected card.

When both the settings of paper input and the settings of paper output are required to be set, the background art requires the user to switch over the selected card. That is, in certain background art the paper input and paper output settings are not on the same card. As a result, the background art is not simple to operate. One idea is to pack both the settings of paper input and the settings of paper output in one card. The simple packing in one card, however, does not show the relationship between the paper input and paper output. As a result, this idea thus does not significantly improve the operability.

SUMMARY OF THE INVENTION

One object of the present invention is thus to solve the above problem of the background art and to improve the operability especially with regard to the settings of paper input and the settings of paper output in a printer by means of a printer driver.

At least part of the above and the other related objects is attained by a printing-related information setting apparatus that includes a display unit and an input unit and sets various pieces of information with regard to printing by a predetermined printing device, based on input data from the input unit according to the contents of a screen display area displayed for data input on the display unit. The printing-related information setting apparatus has a display control unit that causes a printing device image representing the printing device, a paper input settings display box showing information relating to paper input to the printing device, and a paper output settings display box showing information relating to paper output from the printing device to be displayed in a correlating manner in the screen display area.

This arrangement enables the printing device to be displayed in relation to both the paper input settings display box showing the paper input-related information and the paper output settings display box showing the paper output-related information. Unlike in the background art, the present invention does not require the user to switch over the selected card when the user carries out both the settings of paper input and the settings of paper output. The correlation clarifies the flow in the series of processing; that is, the paper input, the printing operation, and the paper output. As a result, this arrangement enhances operability in data input.

In accordance with one preferable application of the printing-related information setting apparatus, the display control unit includes a controller that causes an icon showing the appearance of the printing device to be displayed as the printing device image.

This arrangement enables the user to readily grasp the printing device with the icon or pictorial symbol, thus further enhancing operability in data input.

In accordance with another preferable application of the printing-related information setting apparatus, the display control unit includes a controller that locates the paper input settings display box on one side of the printing device image and the paper output settings display box on the other side of the printing device image.

This arrangement shows the series of processing, that is, the paper input, the printing operation, and the paper output, in this sequence that follows temporally, thus further enhancing operability in data input.

In the printing-related information setting apparatus having any of the above configurations, the display control unit may have a controller that causes a line relating the printer image unit to the paper input settings display box and a line relating the printer image unit to the paper output settings display box to be displayed in the screen display area.

This arrangement enables the user to understand the correlation using the lines at a single glance, thus further enhancing operability in data input.

In accordance with still another preferable application of the printing-related information setting apparatus, the display control unit includes: a paper input display unit that causes a plurality of images corresponding to a plurality of input paper holders set in the printing device to be displayed in the paper input settings display box; and a paper input distinguishable display unit that causes a specific image representing an available input paper holder currently usable in the printing device among the plurality of images displayed by the paper input display unit to be displayed in a distinguishable manner from images representing the other input paper holders.

In the case in which there are a plurality of input paper holders as paper feeders, this arrangement enables the user to distinguish an available input paper holder, which is currently usable, from the others while seeing the plurality of input paper holders. This accordingly further enhances operability in data input.

The printing-related information setting apparatus having the above structure may further include: an input paper holder selection unit that selects one out of the plurality of images displayed by the paper input display unit, based on the input data from the input unit; and an input paper holder setting unit that sets an input paper holder represented by the selected image as the available input paper holder currently usable in the printing device.

This arrangement enables the user to select a desired input paper holder through an operation of the input unit, thus further enhancing operability in data input.

In accordance with one preferable embodiment of the present invention, the printing-related information setting apparatus further has a residual paper quantity-related information input unit that receives a piece of information regarding a residual quantity of paper from the printing device. In this application, the display control unit includes a residual paper quantity display unit that causes the residual quantity of paper to be displayed, based on the received piece of information.

This arrangement enables the user who may be at a place remote from the printing device to readily check the residual quantity of paper, thus enhancing the efficiency of printing operations.

In accordance with another preferable embodiment of the present invention, the printing-related information setting apparatus further has an output paper remaining-related information input unit that receives a piece of information regarding an output paper remaining state from the printing device. In this application, the display control unit includes an output paper remaining-related information display unit that causes the output paper remaining state to be displayed, based on the received piece of information.

This arrangement enables the user who may be at a place remote from the printing device to readily check the output paper remaining state, thus enhancing the efficiency of printing operations.

In accordance with another preferable application of the printing-related information setting apparatus, the display control unit includes a paper output display unit that causes a plurality of images corresponding to a plurality of output paper holders set in the printing device to be displayed in the paper output settings display box.

In the case in which there are a plurality of output paper holders as paper delivery units, this arrangement enables the user to see the plurality of output paper holders, thus further enhancing operability in data input.

In accordance with still another preferable embodiment of the present invention, the printing-related information setting apparatus further has a paper output distinguishable display unit that causes a specific image representing an available output paper holder currently usable in the printing device among the plurality of images displayed by the paper output display unit to be displayed in a distinguishable manner from images representing the other output paper holders.

In the case in which there are a plurality of output paper holders as paper delivery units, this arrangement enables the user to distinguish an available output paper holder, which is currently usable, from the others while seeing the plurality of output paper holders. This accordingly further enhances operability in data input.

In accordance with another preferable embodiment of the present invention, the printing-related information setting further includes: an output paper holder selection unit that selects at least one out of the plurality of images displayed by the paper output display unit, based on the input data from the input unit; and an output paper holder setting unit that sets an output paper holder represented by the selected at least one image as the available output paper holder currently usable in the printing device.

This arrangement enables the user to select a desired output paper holder through an operation of the input unit, thus further enhancing operability in data input.

In accordance with one preferable embodiment of the present invention, the printing-related information setting apparatus having one of the above configurations further has a use allocation unit that individually allocates the right of using the plurality of output paper holders. In this application, the display control unit includes a controller that causes the paper output display unit to display the plurality of images corresponding to the plurality of output paper holders together with use information regarding the right of using individually allocated of the plurality of output paper holders.

A plurality of users individually allocate the right of using to the plurality of output paper holders, and the use information regarding the allocated right of using is displayed. This arrangement relieves the labor of each user to find the output documents of the user, thus enhancing the efficiency of printing operations.

In accordance with another preferable embodiment of the present invention, the printing-related information setting apparatus having one of the above configurations further has a sorter allocation unit that allocates use as a sorter to multiple output paper holders, which are selected among the plurality of output paper holders. In this application, the display control unit includes a controller that causes images representing the multiple output paper holders with the allocated use as the sorter by the sorter allocation unit to be displayed together with information regarding the use as the sorter.

This arrangement allocates the use as a sorter to the selected multiple output paper holders and thereby facilities printing of plural copies. This accordingly enhances the efficiency of printing operations.

In accordance with one preferable application of the present invention, the printing-related information setting apparatus of the above structure further has an available output paper holder specification unit that specifies an available output paper holder out of the plurality of output paper holders, based on a printing condition; and a restrictive display unit that restricts the display by the paper output display unit to display only a specific image representing the specified available output paper holder.

This arrangement prevents the non-available output paper holders from being displayed, based on the printing condition. This accordingly facilitates the selection of a desired output paper holder and further enhances operability in data input.

In accordance with one preferable embodiment of the present invention, the printing-related information setting apparatus of the above configuration further has a use allocation unit that individually allocates the right of using the plurality of output paper holders. In this embodiment, the available output paper holder specification unit sets the allocated right of using as the printing condition.

This arrangement prevents the non-available output paper holders, which are specified by the right of using, from being displayed.

In accordance with another preferable embodiment of the present invention, the printing-related information setting apparatus of the above configuration further has a sorter allocation unit that allocates use as a sorter to multiple output paper holders, which are selected among the plurality of output paper holders. In this embodiment, the available output paper holder specification unit sets the allocated use as the sorter as the printing condition.

This arrangement prevents the non-available output paper holders, which are specified by the use as a sorter, from being displayed.

In accordance with still another preferable embodiment of the present invention, the printing-related information setting apparatus of the above configuration further has a specification unit that specifies a type of paper fed to the printing device. In this embodiment, the available output paper holder specification unit sets the specified type of paper as the printing condition.

This arrangement prevents the non-available output paper holders, which are specified by the type of paper, from being displayed.

The printing-related information setting apparatus of the present invention may further include: a working state-related information input unit that receives a piece of information regarding a working state of the printing device; and a working state display unit that causes the working state to be displayed in the screen display area, based on the received piece of information.

This arrangement enables the user who may be at a place remote from the printing device to readily check the working state of the printing device, thus enhancing the efficiency of printing operations.

The printing-related information setting apparatus of the present invention may also include: a residual expendable quantity-related information input unit that receives a piece of information regarding a residual quantity of an expendable supply from the printing device; and a residual expendable quantity display unit that causes the residual quantity of the expendable supply to be displayed in the screen display area, based on the received piece of information.

This arrangement enables the user who may be at a place remote from the printing device to readily check the remaining quantities of ink, paper, and other expendables, thus enhancing the efficiency of printing operations.

In accordance with another preferable application of the printing-related information setting apparatus, the display control unit includes a basic settings-related information display control unit that causes information regarding basic settings, which affect a printing quality, to be displayed at the position of the printing device image.

This arrangement enables the user to readily grasp the information regarding the basic settings, which affect the printing quality, thus further enhancing operability in data input.

The printing-related information setting apparatus of this arrangement may further include an information display control unit that makes the information displayed by the basic settings-related information display control unit selectable through an operation using the input unit and, when the information is selected, enables the selected information to be modified.

This arrangement enables the basic settings, which affect the printing quality, to be readily modified, thus further enhancing operability in data input.

In accordance with still another preferable application of the printing-related information setting apparatus, the display control unit includes a paper path display unit that causes an image representing a paper feeding path in the course of printing by the printing device to be displayed at the position of the printing device image.

This arrangement enables the user to readily check the paper feeding path in the course of printing by the printing device.

The present invention is also directed to a method of setting various pieces of information with regard to printing by a predetermined printing device, based on input data from an input unit according to the contents of a screen display area displayed for data input on a display unit. The method includes the step of: (a) causing a printing device image representing the printing device, a paper input settings display box showing information relating to paper input to the printing device, and a paper output settings display box showing information relating to paper output from the printing device to be displayed in a correlating manner in the screen display area.

Like the apparatus of the present invention discussed above, this method of the present invention exerts the same effect of enhanced operability in data input.

The present invention is further directed to a computer-readable recording medium, in which a specific computer program is recorded to set various pieces of information with regard to printing by a predetermined printing device, based on input data from an input unit according to the contents of a screen display area displayed for data input on a display unit. The specific computer program causes a computer to attain the function of: (a) causing a printing device image representing the printing device, a paper input settings display box showing information relating to paper input to the printing device, and a paper output settings display box showing information relating to paper output from the printing device to be displayed in a correlating manner in the screen display area.

Like the apparatus and the method of the present invention discussed above, this recording medium of the present invention exerts the same effect of enhanced operability in data input.

The principle of the present invention may be actualized by a diversity of other applications, examples of which are now provided. The first application is a computer program that causes the computer to attain the respective steps or the functions of the respective units discussed above. The second application is a data signal that includes this computer program and is embodied in a carrier wave. The third application is a program supply unit that supplies this computer program via a communication path. In this third application, programs are stored in, for example, a server on a network. A required computer program is downloaded to the computer via the communication path and is executed to attain the method or the apparatus of the present invention discussed above.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
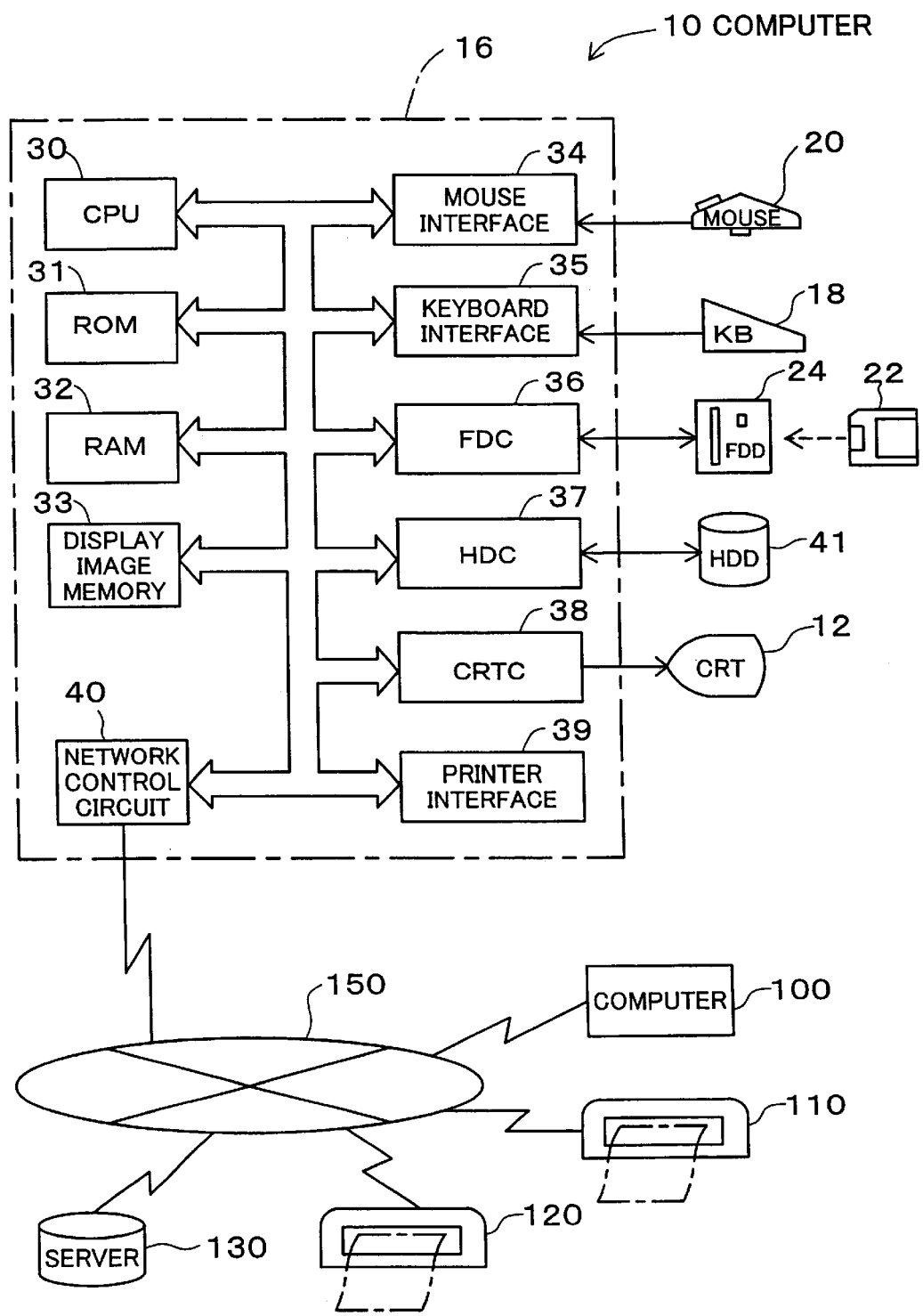
FIG. 1 is a block diagram schematically illustrating the hardware configuration of a computer system in a first embodiment of the present invention.

Some modes of carrying out the present invention are described below as preferred embodiments, in order to further clarify the features, the advantages, and the functions of the present invention. FIG. 1 is a block diagram schematically illustrating the hardware configuration of a computer system in a first embodiment of the present invention.

As illustrated in FIG. 1, a computer 10 of this embodiment is connected with another computer 100, printers 110 and 120 substantially having the functions of the computer, and a server 130 having a common database via a computer network 150 constructed as a local area network (LAN). A diversity of networks other than the LAN, for example, the Internet, an intranet, a wide area network (WAN), etc., may be utilized as the computer network 150. The printers 110 and 120 are laser printers that use a laser to produce images on a photographic drum and transfer the images developed by the toner to paper. A diversity of other printers, such as ink jet printers, thermal transfer printers, etc., may also be utilized as the printers 110 and 120.

A CRT display 12 is connected as one of peripheral equipment to the computer 10. The computer 10 includes a computer main body 16, a keyboard 18, and a mouse 20. The computer main body 16 has a floppy disk drive 24 to read the contents of a floppy disk 22.

The computer main body 16 includes a CPU 30 or central processing unit, a ROM 31, a RAM 32, a display image memory 33, a mouse interface 34, a keyboard interface 35, an FDC 36, an HDC 37, a CRTC 38, a printer interface 39, and a network control circuit 40, which are mutually connected via a bus.

The ROM 31 is a read only memory in which a diversity of internal programs are stored. The RAM 32 is a memory which a variety of data are written in and read from. The display image memory 33 stores picture data of images to be displayed on the CRT display 12. The mouse interface 34 controls data transmission from the mouse 20. The keyboard interface 35 controls key inputs from the keyboard 18. The FDC 36 is a floppy disk controller that controls the floppy disk drive (FDD) 24. The HDC 37 is a hard disk controller that controls hard disk drive (HDD) 41.

The CRTC 38 is a CRT controller that controls display of images on the CRT display 12, based on display image data stored in the display image memory 33. The printer interface 39 controls output of data to a locally connecting printer. There is no locally connecting printer in the illustrated example, but such a printer is connectable according to system requirements. The network control circuit 40 includes a network card and is connected to the computer network 150. The network control circuit 40 is constructed as a modem in the case in which the computer network 150 communicates via a telephone line.

In the illustrated computer system, the operating system is stored in the HDD 41. On supply of power to the computer main body 16, the operating system is loaded to a predetermined area in the RAM 32 according to a loader written in a boot block of the HDD 41. The printer driver provided for each model of the printer is recorded in advance in the floppy disk 22 and installed from the floppy disk drive 24 onto the computer main body 16 on activation of a predetermined installation program. The installed printer driver is stored in the HDD 41, is incorporated into the operating system on supply of power to the computer main body 16, and is loaded to a predetermined area in the RAM 32.

Figure 2:
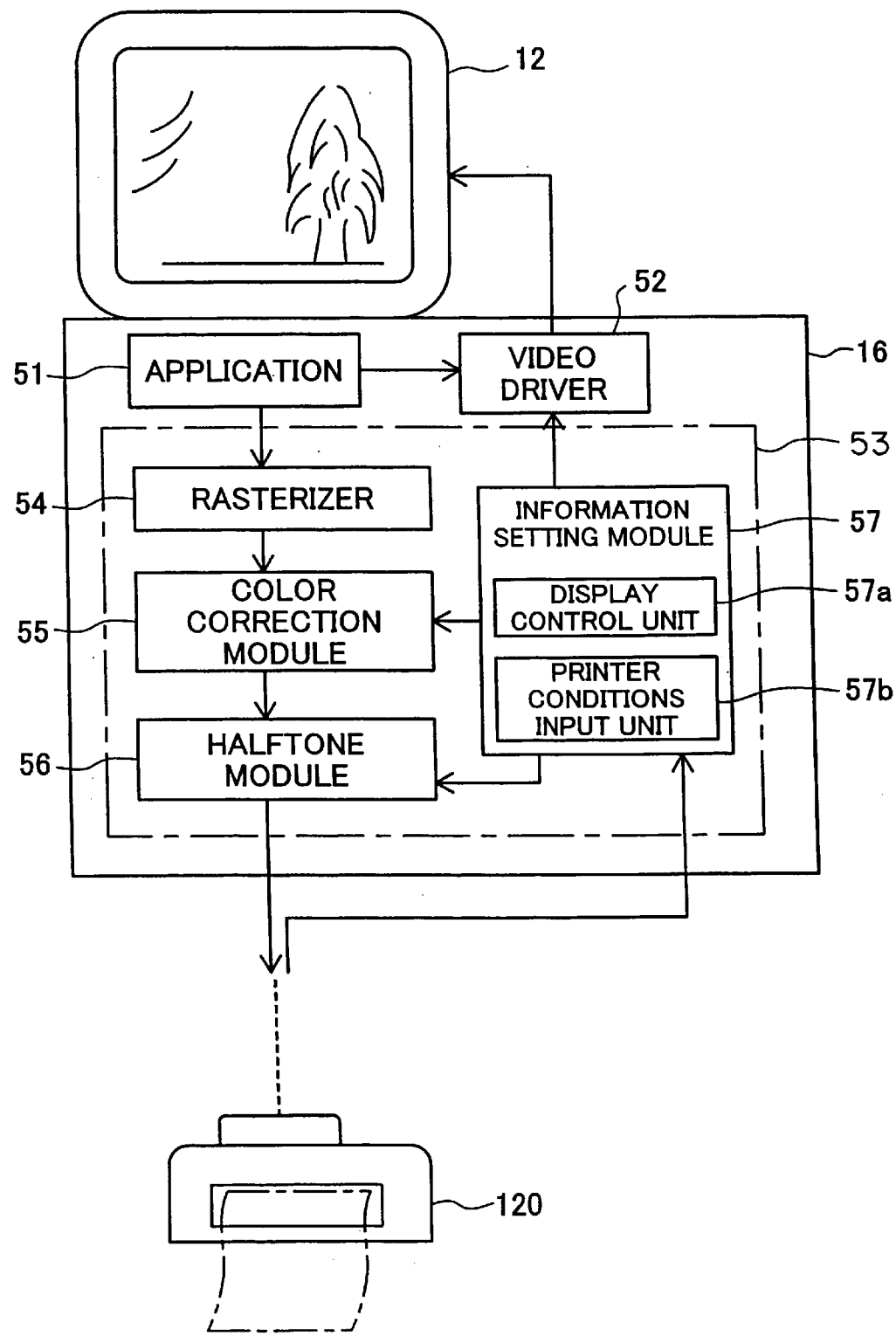
FIG. 2 is a block diagram showing a series of processing to complete a printing operation based on image information processed by a computer main body 16.

The following describes a printing process carried out by the computer system having the hardware configuration as discussed above. FIG. 2 is a block diagram showing a series of processing to complete a printing operation based on image information processed by the computer main body 16. As illustrated, an application program 51 working in the computer main body 16 carries out image processing and causes a processed image to be displayed on the CRT display 12 via a video driver 52. When the application program 51 issues an instruction of printing, a printer driver 53 in the computer main body 16 receives image information from the application program 51 and converts the input image information to printable signals by the printer 110 that is currently available (the following description is on the assumption that the printer 110 is currently available).

In the illustrated example of FIG. 2, the printer driver 53 includes a rasterizer 54 that converts the image information processed by the application program 51 into color information by the unit of dots, a color correction module 55 that carries out color correction of the image information (tone data), which has been converted to the color information by the unit of dots, according to the color development characteristics of the printer 110, and a halftone module 56 that generates halftone image information, which expresses the density of a certain area by the presence or absence of the toner by the unit of dots, from the color corrected-image information. The printer driver 53 also includes an information setting module 57 to set various pieces of information required for printing by the printer 110. The various pieces of information required for printing include information regarding the basic settings of printing, such as the printing quality, the color correction, and the type of halftone processing, as well as information regarding paper handling, that is, paper input and paper output, in the printer.

Although the halftone module 56 is included in the computer 10 in this embodiment, the halftone module may alternatively be provided in the printers 110 and 120 connecting with the computer 10. Advanced laser printers may have a high-performance computer incorporated therein, and thus can readily attain the function of the halftone module.

The information regarding the color correction set by the information setting module 57 is sent to the color correction module 55, whereas the information regarding the type of halftone processing is sent to the halftone module 56. The information setting module 57 causes an image representing the contents of the settings to be displayed on the CRT display 12 via the video driver 52. The information setting module 57 includes a display control unit 57a and a printer conditions input unit 57b as main parts of the present invention. The operations of the respective modules other than the information setting module 57 are known in the art and are thus not specifically described here in principle. The information setting module 57 is discussed below in detail.

Changing the settings of the printer driver 53 controls printing by the printer 110 in various ways. The operator should specify the settings in advance. The information setting module 57 actually carries out the work to set various pieces of information required for printing. The screen display on the CRT display 12 controlled by the operations of the information setting module 57 is described first. In the following description, Windows 95 (trade mark by Microsoft Corporation) is used as the operating system, on which the printer driver works, although other operating systems could instead be used.

The operator first carries out a series of operations in the computer 10 to display a dialog box on the CRT display 12 to set the various pieces of information required for printing. In accordance with concrete procedures, the operator clicks the Start button and selects the Settings option and the Printer option in this sequence to open the Printer window. The operator then double clicks an icon representing a printer of interest (in this case, the printer of interest is the printer 10 having the type name PR-00) in the Printer window to open a window with regard to the selected printer of interest. The operator subsequently selects the Printer option and the Properties option in the window to open a Properties dialog box for setting the various pieces of information with regard to the printer of interest.

Figure 3:
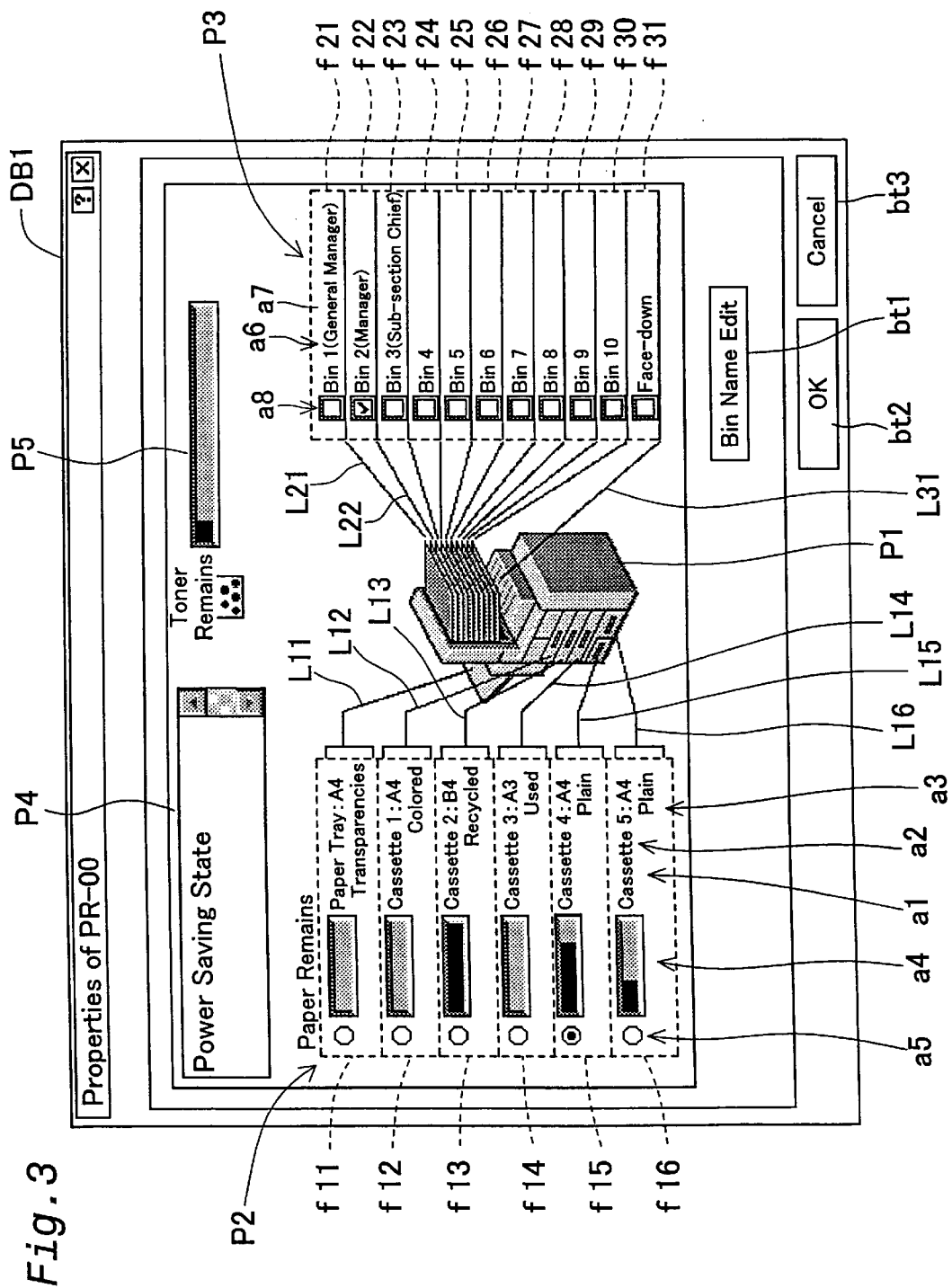
FIG. 3 shows a Properties dialog box DB1.

FIG. 3 shows a Properties dialog box DB1 opened by the above procedures. In the illustrated example, an image P1, which is a pictorial symbol schematically showing the appearance of the printer 110, is displayed in the substantial center of the dialog box DB1. A paper input settings display box P2 showing information with regard to paper input to the printer 110 is displayed on the left side of the image P1, whereas a paper output settings display box P3 showing information with regard to paper output from the printer 110 is displayed on the right side of the image P1.

The image P1 corresponding to the printer 110 has the function of the icon. When the user clicks on the image P1 with the mouse 20, the Basic Settings window, which is not illustrated, is activated and displayed for the basic settings of printing mentioned above. The Basic Settings window has no direct relations to the technique of the present invention and is thus not specifically described here.

As illustrated in FIG. 3, the printer 110 represented by the image P1 has one paper tray and five cassettes as paper input holders, and a multi-bin unit having ten bins and one face-down tray as paper output holders. The paper input settings display box P2 has six display fields f11, f12, f13, f14, f15, and f16 respectively corresponding to the one paper tray and five cassettes. Each of the display fields f11 through f16 has a name description area a1 representing the name of the corresponding paper input holder, a size description area a2 representing the size of paper set therein (the paper input), a paper type description area a3 representing the type of paper set therein, a remaining paper quantity meter a4 showing the remaining quantity of paper in the form of a bar graph, and a radio button a5 for selecting a desired paper input holder to be used. The display fields f11 through f16 are respectively mapped to the one paper tray and five cassettes for the paper input in the image P1 by indication lines L11, L12, L13, L14, L15, and L16.

Predetermined names, for example, Paper Tray, Cassette 1, Cassette 2, Cassette 3, Cassette 4, and Cassette 5, are displayed in the name description areas a1 of the respective display fields f11 through f16. Desired sizes selected among a plurality of options, for example, A4, A3, and B4, are displayed in the size description areas a2. Desired paper types selected among a plurality of options, for example, Plain, Recycled, and Transparencies, are displayed in the paper type description areas a3. Each of the radio buttons a5 is clicked on and off with the mouse 20, so that a desired paper input holder is selected in an alternative manner.

The paper output settings display box P3 has eleven display fields f21, f22, f23, f24, f25, f26, f27, f28, f29, f30, and f31 respectively corresponding to the ten bins of the multi-bin unit and one face-down tray. Each of the display fields f21 through f31 has a name description area a6 representing the name of the corresponding paper output holder, an attribute description area a7 representing additional information, such as indicating who has the right to use each bin, and a checkbox a8 for selecting a desired paper output holder to be used. The display fields f21 through f31 are respectively mapped to the ten bins and one face-down tray for the paper output in the image P1 by indication lines L21, L22, . . . , L31.

Predetermined names, for example, Bin 1, Bin2, . . . , Bin 10, and Bin 11, are displayed in the name description areas a6 of the respective display fields f21 through f31. Identification names of the users (more strictly, the computers used), such as General Manager, Manager, Sub-section Chief, are displayed in the attribute description areas a7. The identification names are editable by clicking on a Bin Name Edit button bt1 located on the lower side of the paper output settings display box P3.

Figure 4:
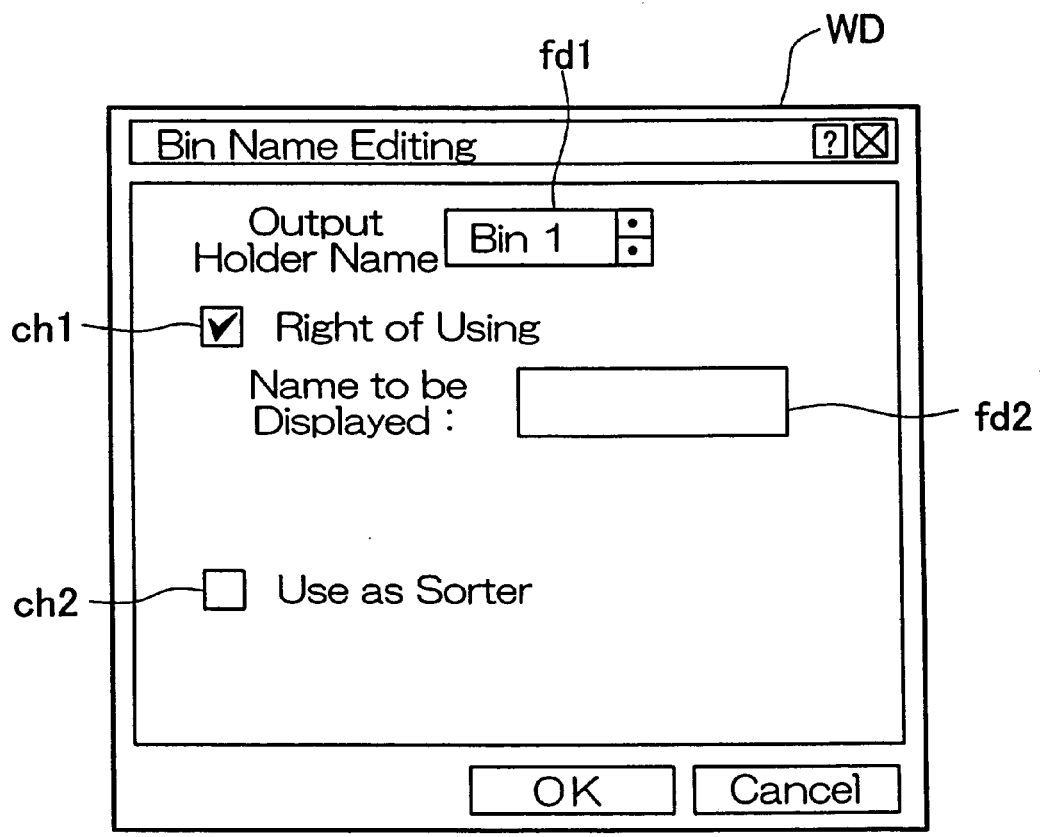
FIG. 4 shows a Bin Name Editing window WD displayed in response to a click of a Bin Name Edit button bt1.

FIG. 4 shows a Bin Name Editing window WD displayed in response to a click of the Bin Name Edit button bt1. As illustrated, the Bin Name Editing window WD has a first checkbox ch1 to set or clear the right of using and a second checkbox ch2 to set or clear the use as a sorter. The user uses an Output Holder Name drop-down list box to set a desired paper output holder in a data input box fd1, and clicks the checkbox ch1 to specify the desired paper output holder as the destination of the paper output. The computer with such settings in the printer driver sends all the output documents to the paper output holder having the name set in the data input box fd1. The identification name of the user, for example, General Manager, Manager, or Sub-section Chief, that has been entered in a second field fd2 through operations of the keyboard 18 is displayed in the attribute description area a7 in the paper output settings display box P3.

The user clicks the second checkbox ch2 in the Bin Name Editing window WD, in order to set the use as a sorter.

Figure 5:
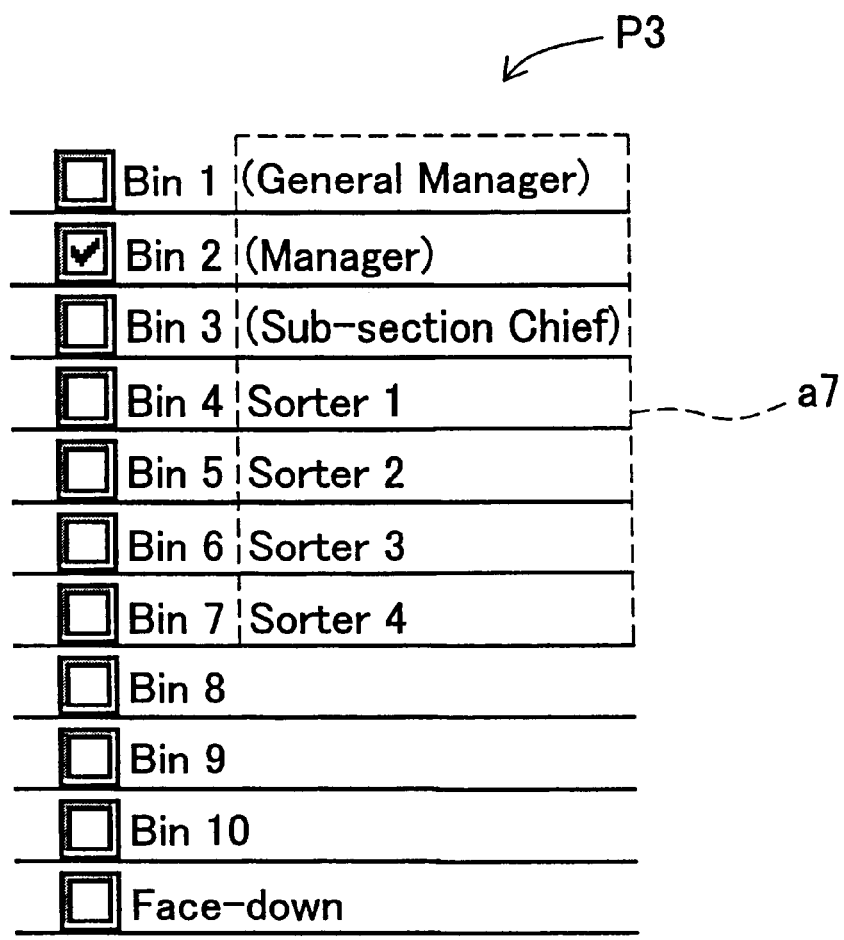
FIG. 5 shows an example of a paper output settings display box P3 set as a sorter.

Under such settings, as shown in FIG. 5, Sorter 1, Sorter 2, . . . are displayed in the attribute description area a7 in the paper output settings display box P3 for the bins which can be used in a sorting operation.

Referring back to FIG. 3, there is a window P4 showing the current working state of the printer 110 above the paper input settings display box P2. Typical examples of the working state include power saving, stand-by, and communication error. A toner remaining quantity meter P5 showing the remaining quantity of the toner is disposed above the paper output settings display box P3. The dialog box DB1 also has an OK button bt2 and a Cancel button bt3.

In the Properties dialog box DB1 having the configuration discussed above, the paper input settings display box P2 shows the paper type and its remaining quantity in each paper input holder. A desired paper input holder to be used is set by selecting one of the radio buttons a5. The paper output settings display box P3 shows the right of using output bins set in each paper output holder. One or a plurality of desired paper output holders to be used are set by checking the corresponding checkboxes a8. Clicking on the image P1, which is the pictorial symbol of the printer, activates the window for the basic settings of printing.

The CPU 30 executes a processing routine of the information setting module 57 in the printer driver 53 to implement the screen display on the CRT display 12 described above. The following describes this processing routine of the information setting module 57.

Figure 6:
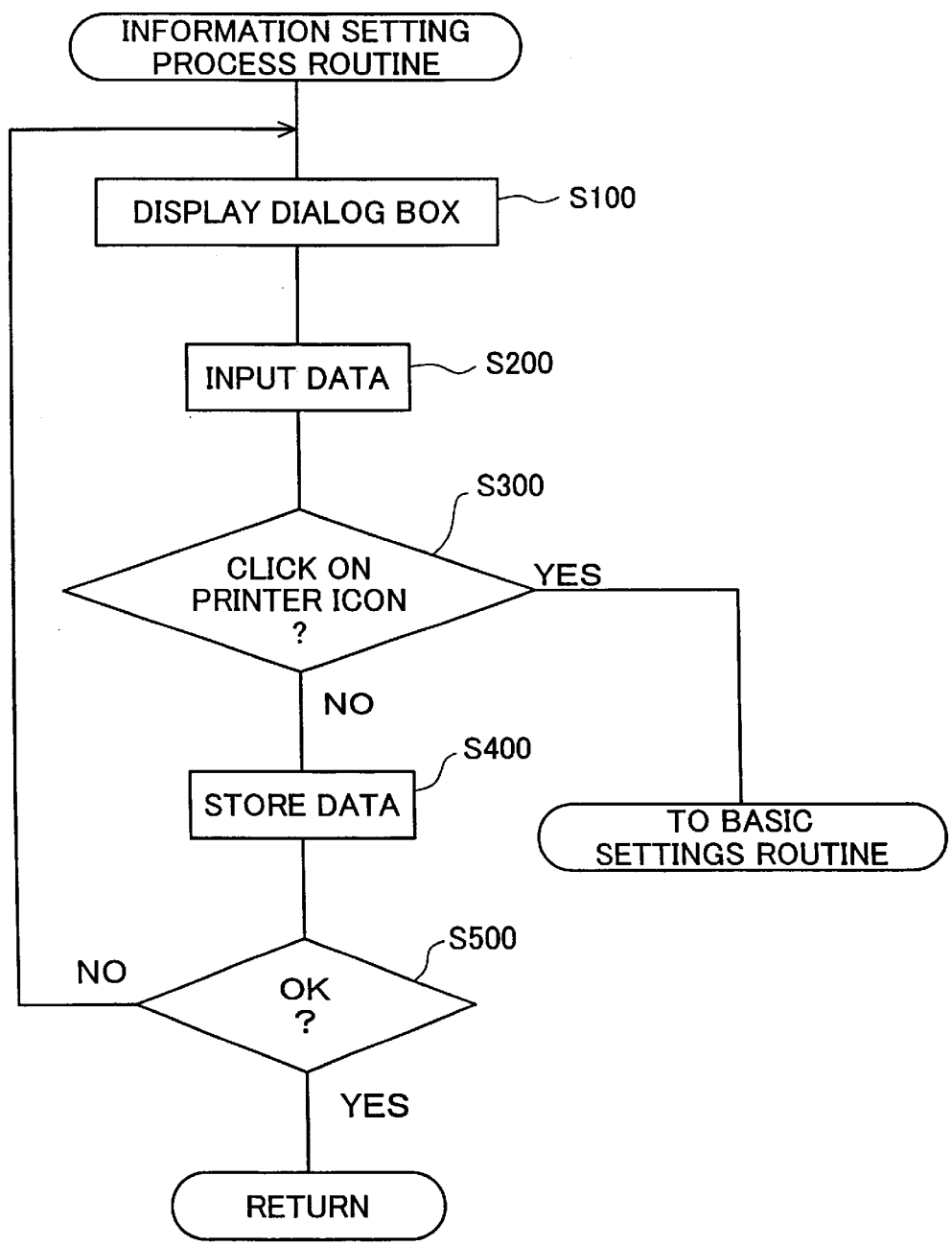
FIG. 6 is a flowchart showing an information setting process routine executed by a CPU 30.

FIG. 6 is a flowchart showing the processing routine of the information setting module 57. The information setting process routine is carried out when the user opens the window with regard to the selected printer of interest and subsequently selects the Printer option and the Properties option in the window.

When the program enters the routine, the CPU 30 first carries out a dialog box display routine to display image data representing the Properties dialog box DB1 on the CRT display 12 (step S100). The CPU 30 then waits for the input of various data with the keyboard 18 and the mouse 20 by the operator who checks the screen display on the CRT display 12 (step S200). The CPU 30 subsequently determines whether or not the image P1, which is the pictorial symbol of the printer, is clicked on (step S300), based on the input data. When it is determined that the image P1 is not clicked on (no in step S300), the program proceeds to step S400 to store the various input data into predetermined areas on the RAM 32. The various input data are compared with a reference table provided in advance. This process gives the item corresponding to the coordinates of the data input box and specifies the position on the RAM, at which the input data is to be stored.

When it is determined at step S300 that the image P1 is clicked on (yes in step S300), on the other hand, the program proceeds to a basic settings routine to display the Basic Settings window mentioned previously.

The processing of step S100 causes the image data representing the Properties dialog box DB1 as illustrated in FIG. 3 to be displayed on the CRT display 12. The operator checks the image data displayed on the CRT display 12 and operates the mouse 20, for example, to click the radio button a5 in the display field f11 of Paper Tray in the paper input settings display box P2. The CPU 30 receives the data representing the click of the radio button a5 by the processing of step S200. The processing of step S400 stores the data of the Paper Tray option selected by the click of the radio button a5 in a predetermined area on the RAM 32.

After completion of the data storage by the processing of step S400, it is determined whether the operator has clicked on the OK button bt2 in the screen display (step S500). When the OK button bt2 is not clicked on (no in step S500), the program returns to step S100 and repeats the flow of this information setting process routine. When it is determined at step S500 that the OK button bt2 is clicked on (yes in step S500), on the other hand, the program exits from this information setting process routine.

Figure 7:
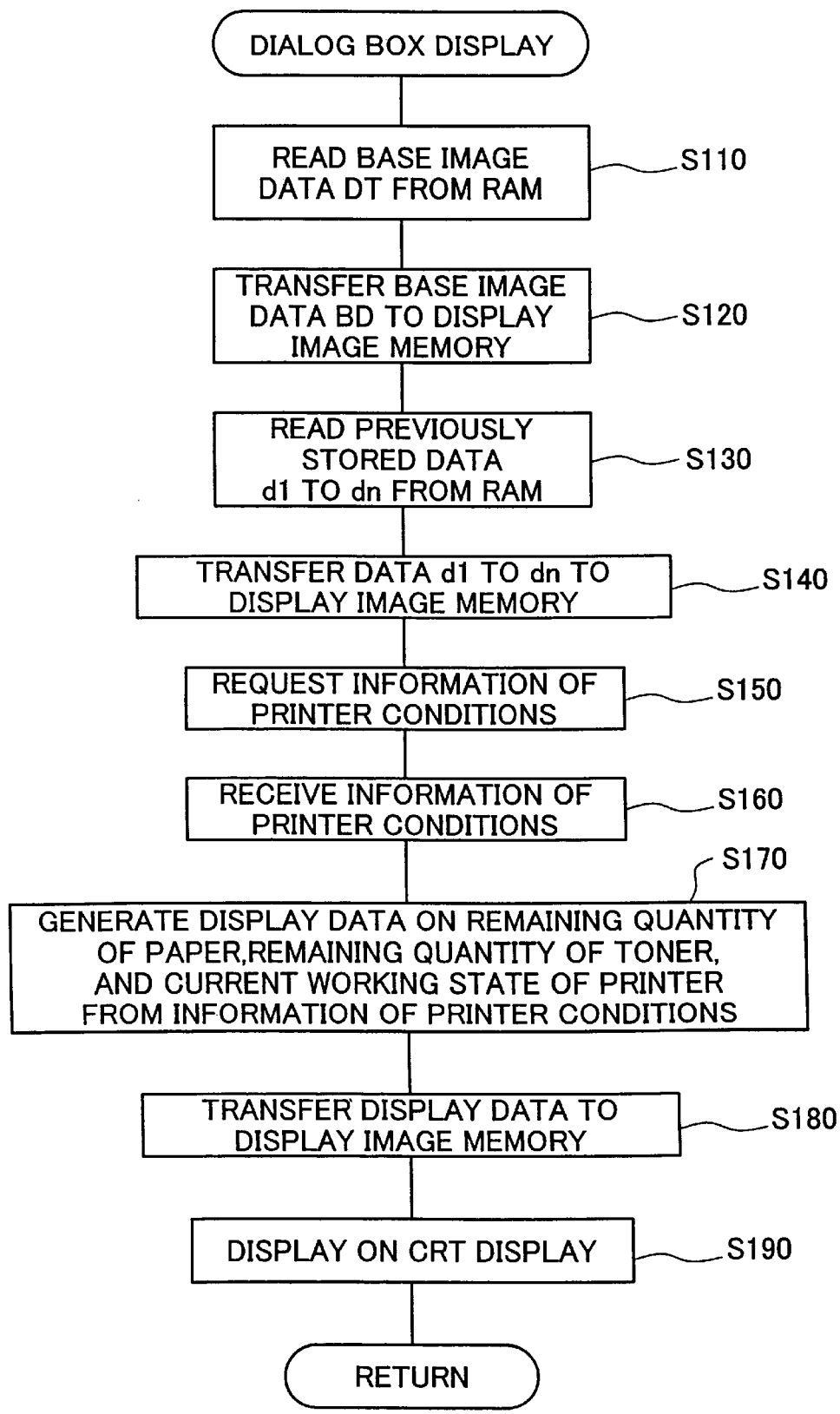
FIG. 7 is a flowchart showing a dialog box display routine.
Figure 8:
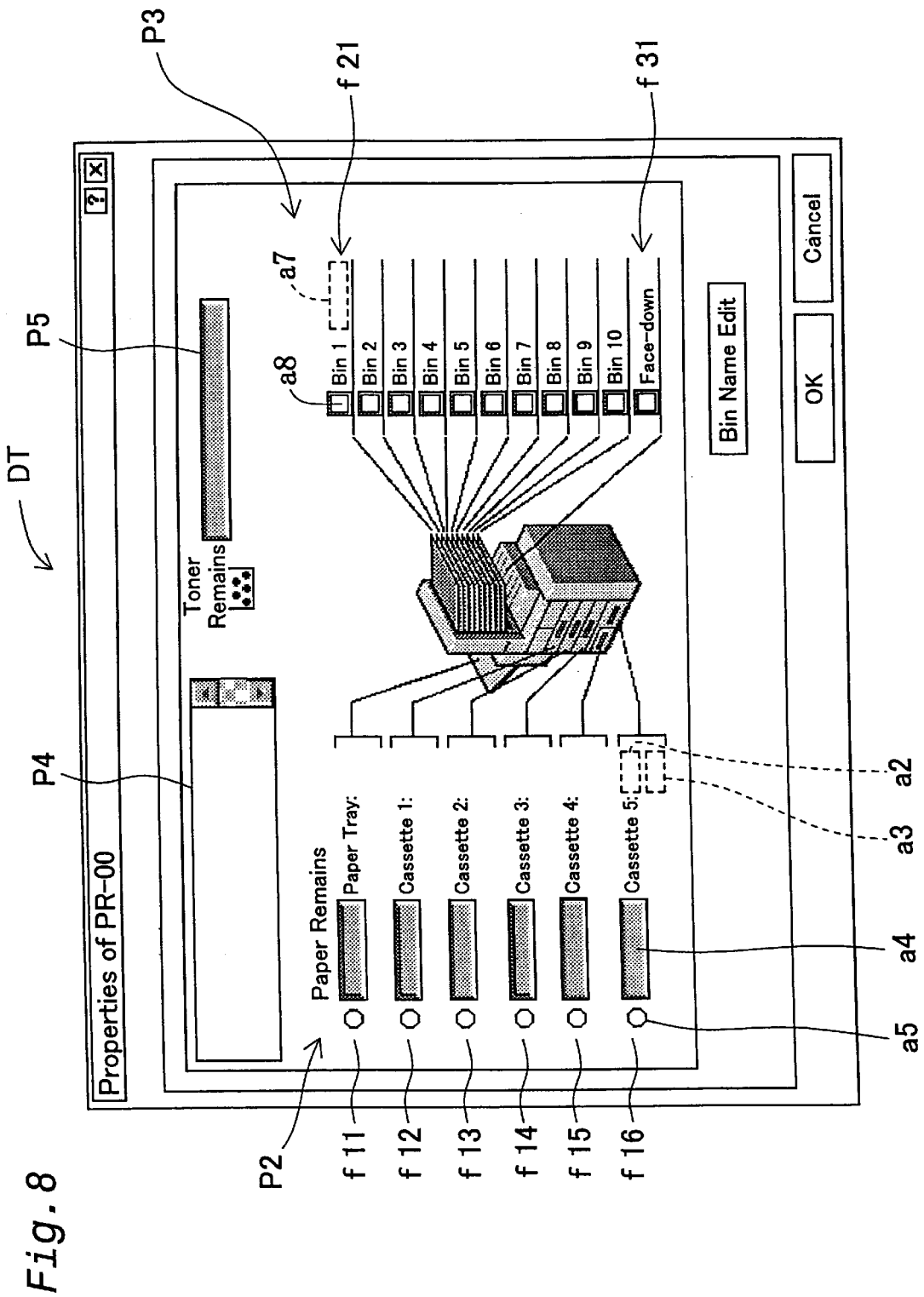
FIG. 8 shows base image data DT.

The following describes the details of the dialog box display routine carried out at step S100. FIG. 7 is a flowchart sowing the dialog box display routine. When the program starts the processing of step S100, as shown in FIG. 7, the CPU 30 first reads base image data DT, which is the base of the Properties dialog box DB1, from the RAM 32 (step S110) and transfers the base image data DT to the display image memory 33 (step S120). The base image data DT represents a fixed image, which excludes all the variable parts from the image of the dialog box DB1 shown in FIG. 3. FIG. 8 shows this fixed image. In each of the display fields f11 through f16 of the paper input settings display box P2, the size description area a2, the paper type description area a3, the remaining paper quantity meter a4, and the radio button a5 are vacant. In each of the display fields f21 through f31 of the paper output settings display box P3, the attribute description area a7 and the checkbox a8 are vacant. The window P4 and the toner remaining quantity meter P5 are also vacant. The image data of this fixed image is transferred as the display image data to the display image memory 33.

Figure 9:
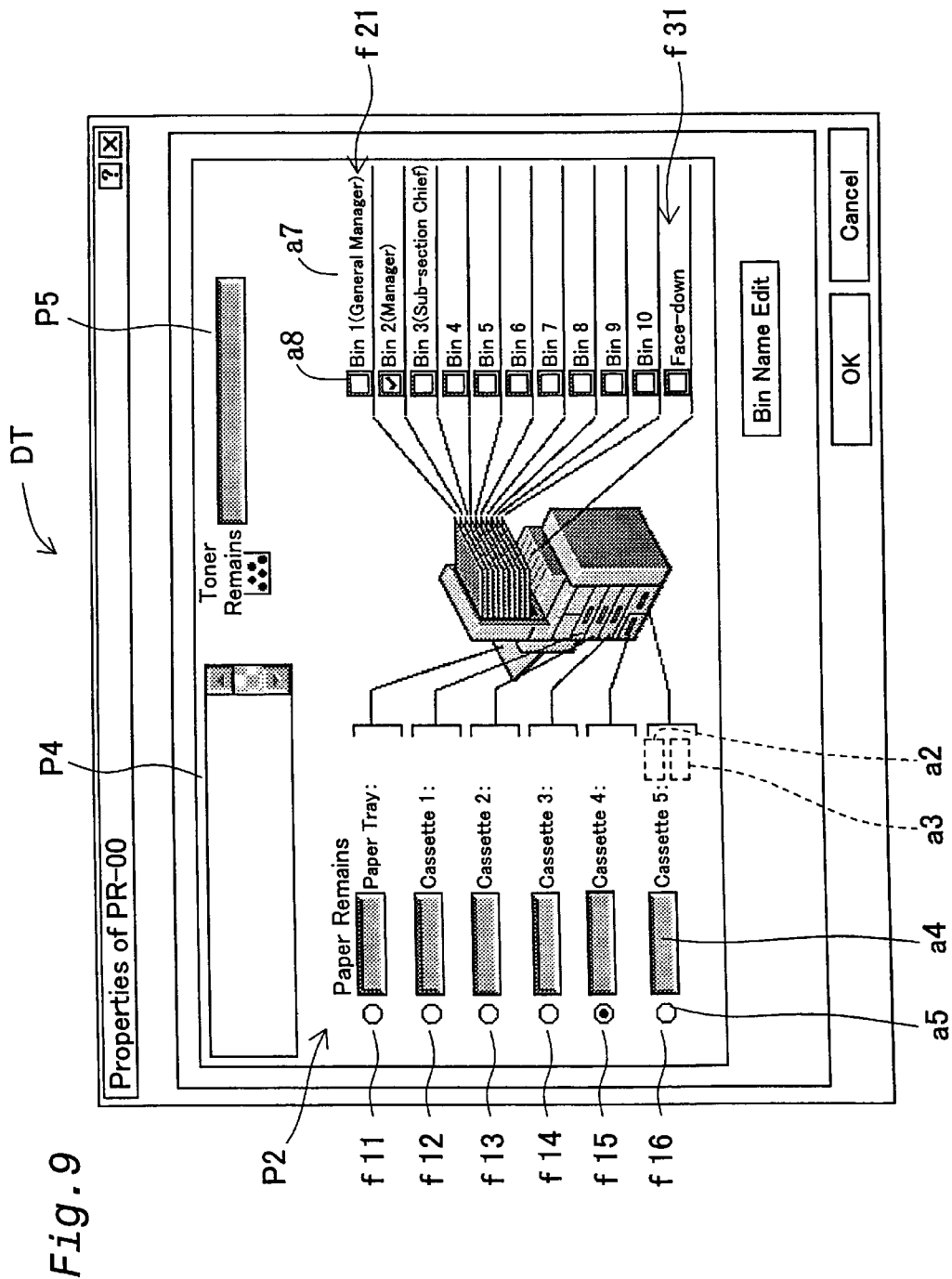
FIG. 9 shows displayed image data after addition of various data d1 through dn.

Referring back to the flowchart of FIG. 7, the CPU 30 then reads various data d1 through dn (here n is an arbitrary positive number), which have been stored by the processing of step S400 up to the previous cycle, from the RAM 32 (step S130) and transfers the various data d1 through dn to the corresponding areas in the display image data stored in the display image memory 33 (step S140). The resulting display image data stored in the display image memory 33 at this moment includes the series of letters or characters or pictorial symbols in the radio button a5, the attribute description areas a7, and the checkbox a8 based on the various data d1 through dn as shown in FIG. 9. The size description areas a2, the paper type description areas a3, and the remaining paper quantity meters a4 in the paper input settings display box P2, the window P4, and the toner remaining quantity meter P5 are still vacant at this moment.

Referring back again to FIG. 7, after execution of the processing at step S140, the CPU 30 requests the printer 110, which is currently usable, to send the information with regard to the current conditions of the printer (step S150), and receives from the printer 110 the required information regarding the current conditions of the printer (step S160). The information regarding the current conditions of the printer here include information with regard to the current working state of the printer, such as a Stand-by signal, information with regard to the remaining quantities of the expendables like the toner and paper used in the printer, and information set on the control panel in the printer (for example, the paper size and the paper type). The printers 110 and 120 have the function of detecting the current conditions of the printer from a diversity of sensors, such as a toner remaining quantity sensor and a remaining paper quantity sensor, and control instructions given to the printer engine. The computer 10 receives the information regarding such conditions of the printer through the processing of steps S150 and S160.

The CPU 30 subsequently generates display data representing the remaining quantity of paper, the remaining quantity of toner, and the current working state of the printer (step S170), based on the information regarding the current conditions of the printer input from the printer 110 at step S160. The CPU 30 then transfers the generated display data to the respective vacant areas in the display image data stored in the display image memory 33 (step S180). This results in adding the required series of letters or characters or pictorial symbols filled in the size description areas a2, the paper type description areas a3, and the remaining paper quantity meters a4 in the paper input settings display box P2, the window P4, and the toner remaining quantity meter P5 to the display image data stored in the display image memory 33 in the state of FIG. 9.

Referring back to FIG. 7, the CRTC 38 controls the display of the image on the CRT display 12, based on the display image data stored in the display image memory 33 (step S190). This results in displaying the Properties dialog box DB1 on the CRT display 12 as shown in FIG. 3. After execution of the processing at step S190, the program goes to Return and exits from this routine.

The series of processing for data input described above is then carried out (step S200 in the flowchart of FIG. 6) using the Properties dialog box DB1 displayed on the CRT display 12.

In the first embodiment having the above arrangement, the Properties dialog box DB1 is displayed. The Properties dialog box DB1 includes the image P1 that is the pictorial symbol schematically representing the appearance of the printer, the paper input settings display box P2 showing the information regarding the paper input to the printer 110, and the paper output settings display box P3 showing the information regarding the paper output from the printer 110, which are displayed in a mutually correlated manner using the indication lines L11 through L16 and L21 through L31.

Unlike in the background art, the operation of this embodiment does not require the user to switch over the selected card when the user carries out both the settings of paper input and the settings of paper output. The correlation clarifies the flow in the series of processing; that is, the paper input, the printing operation, and the paper output. As a result, this arrangement enhances operability in data input. The printer 110 is represented by the pictorial symbol of the image P1. The user thus readily recognizes the details of the display.

In the arrangement of this embodiment, the paper input settings display box P2 has the radio buttons a5 corresponding to the one paper tray and five cassettes as the paper input holders. The user selects a desired paper input holder to be used by clicking the corresponding radio button a5. This arrangement enhances operability in data input.

In the structure of this embodiment, the remaining paper quantity meter a4 is provided corresponding to each of the paper input holders. This arrangement enables the user who may be at a place remote from the printer 110 to readily check the remaining quantities of paper in the paper tray and the respective cassettes through the operations of the computer at hand. This effectively enhances the efficiency of the printing operations.

In the arrangement of this embodiment, the paper output settings display box P3 has the checkboxes a8 corresponding to the ten bins and one face-down tray as the paper output holders. The user selects a desired paper output holder to be used by checking the corresponding checkbox a8. This arrangement enhances operability in data input.

In the arrangement of this embodiment, the identification names of the users like General Manager, Manager, and Sub-section Chief are shown corresponding to the respective paper output holders. This arrangement relieves the labor of the user to find the output documents of the user, thus further enhancing the efficiency of the printing operations.

In the structure of this embodiment, the Properties dialog box DB1 includes the window P4 showing the current working state of the printer 110. This arrangement enables the user who may be at a place remote from the printer 110 to readily check the current working state of the printer 110 through the operations of the computer at hand. This further enhances the efficiency of the printing operations.

In the structure of this embodiment, the Properties dialog box DB1 includes the toner remaining quantity meter P5 representing the remaining quantity of the toner. This arrangement enables the user who may be at a place remote from the printer 110 to readily check the remaining quantity of the toner through the operations of the computer at hand. This further enhances the efficiency of the printing operations.

Some possible modifications of the first embodiment are described below as other modes of carrying out the present invention. The following describes a first modified example.

Whereas the structure of the first embodiment displays the preset right of using the respective bins (including the face-down tray) in the attribute description areas a6 of the paper output settings display box P3, the structure of the first modified example enables the output paper remaining state in each bin to be also displayed in the corresponding attribute description area a6.

Figure 10:
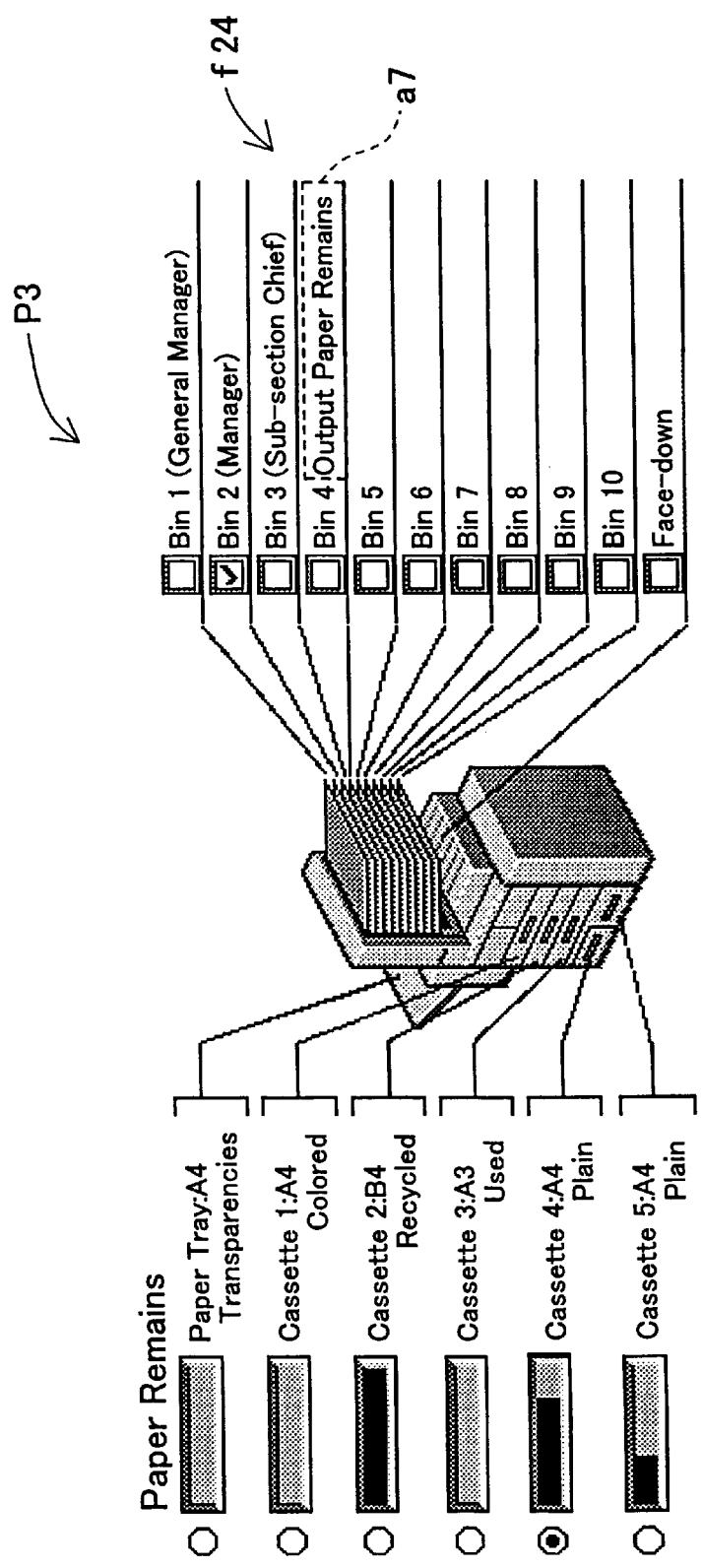
FIG. 10 shows the main part of the Properties dialog box displayed in a first modified example.

FIG. 10 shows the main part of the Properties dialog box displayed by a modified dialog box display process executed in the first modified example. In the illustrated example, "Output Paper Remains" representing that output paper is remaining (in Bin 4) is displayed in the attribute description area a6 in the display field f24 of Bin 4 in the paper output settings display box P3.

In the first modified example, the printer 120 has paper output remaining sensors to detect the presence of any remaining paper output respectively in the ten bins of the multi-bin unit and one face-down tray. These sensors optically detect the presence of the output paper. The dialog box display routine executed by the CPU is modified as follows in this modified example. The processing of step S160 in the modified dialog box display routine receives the results of detection of the paper output remaining sensors as part of the information regarding the current conditions of the printer. The output paper remaining state is then displayed based on the results of detection by the processing of steps S170 through S190.

This arrangement enables the user who may be at a place remote from the printer 110 to readily check whether any output paper remains in any of the ten bins of the multi-bin unit and one face-down tray through the operations of the computer at hand. This further enhances the efficiency of the printing operations.

The following describes a second modified example. In the structure of the first embodiment, the names of all the paper output holders are displayed in the display fields f21 through f31 corresponding to the ten bins and one face-down tray set as the paper output holders. The user selects a desired one among all the paper output holders as the destination of paper output. All or some of these eleven choices may, however, not be properly selectable but may instead be unavailable as a result of the printing conditions. The second modified example keeps any of the display fields f21 through f31 corresponding to the unavailable paper output holders according to the printing conditions to be displayed and to be vacant.

The second modified example has similar hardware and software configurations to those of the first embodiment, except the dialog box display process executed by the CPU 30.

Figure 11:
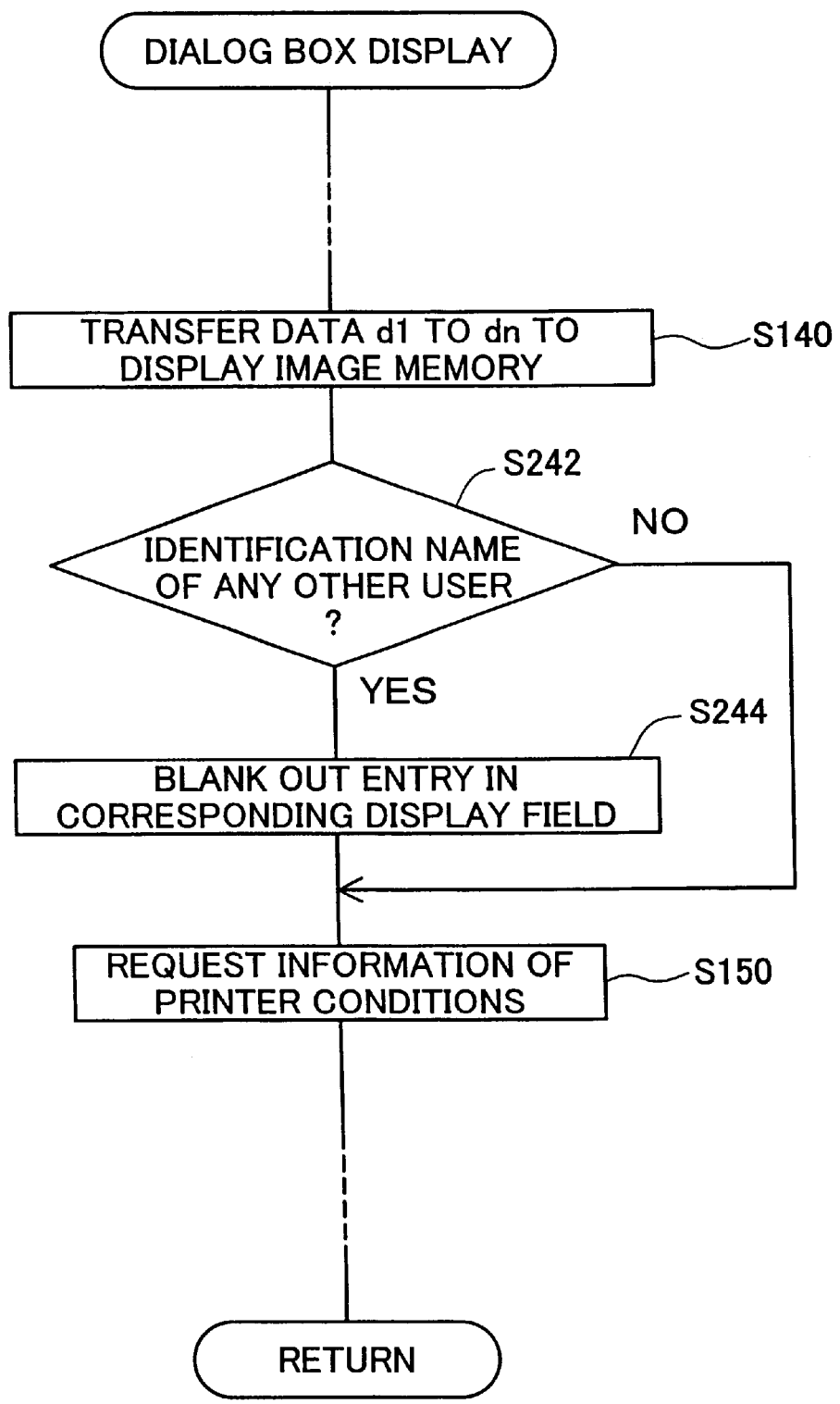
FIG. 11 is a flowchart showing the characteristic part of the dialog box display routine in a second modified example.

FIG. 11 is a flowchart showing the characteristic part of the dialog box display routine executed in the second modified example. When the program enters the routine, the CPU 30 carries out the same series of processing as that of the first embodiment up to step S140. The CPU 30 subsequently extracts the item corresponding to the attribute description areas a7 in the paper output settings display box P3 from the variety of data d1 through d7 read from the RAM 32, and determines whether or not the extracted data includes identification names of any users other than the user who uses the computer 10 (step S242). In the case of the affirmative answer (yes in step S242), the CPU 30 blanks out any entry in the areas of the display fields f21 through f31 on the display image memory, to which the data representing the identification names of the other users have been transferred (step S244). The program then proceeds to step S150 that is identical with the processing of the first embodiment.

In the case of the negative answer (no) at step S242, on the other hand, the program skips the processing of step S244 and directly proceeds to step S150.

Figure 12:
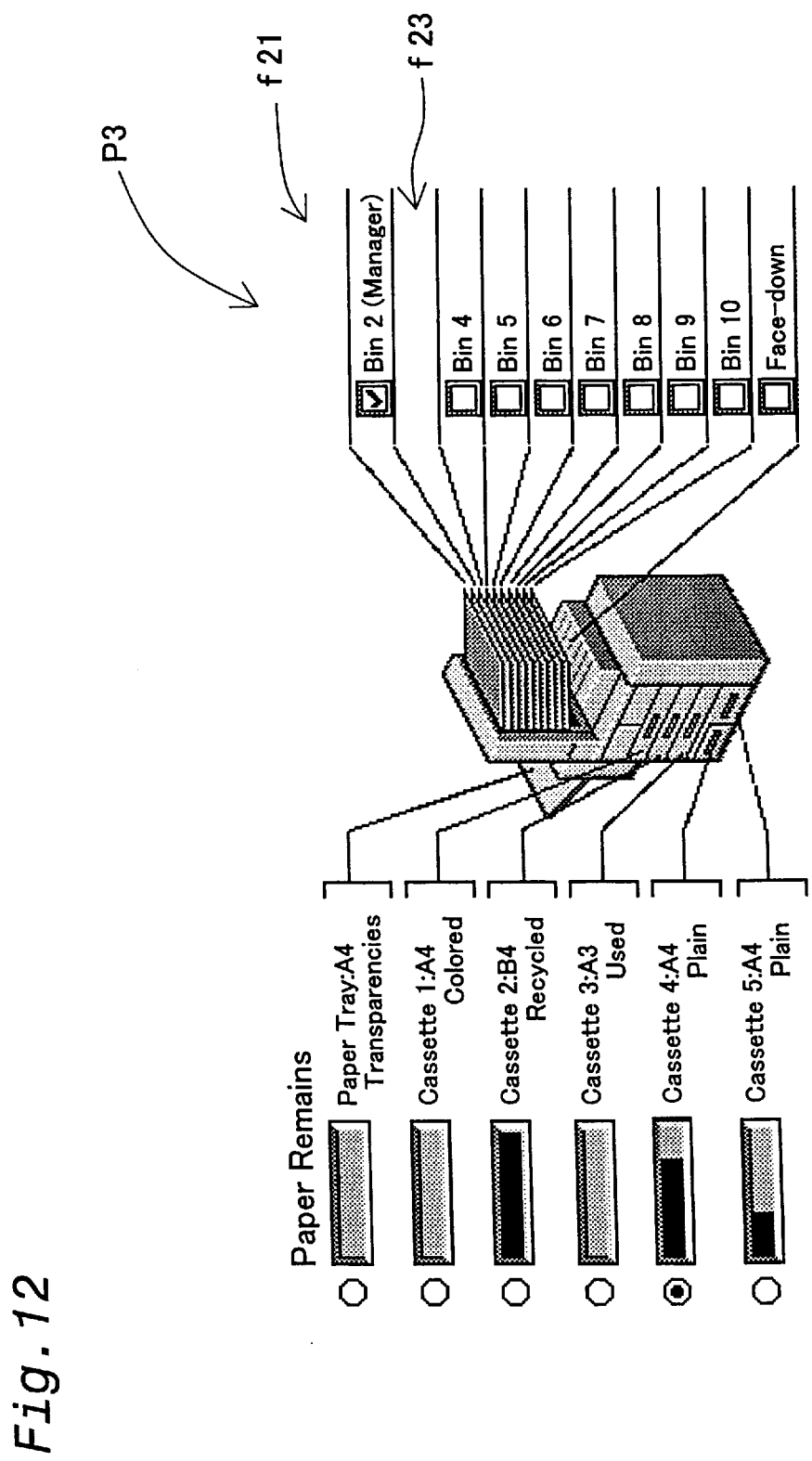
FIG. 12 shows the main part of the Properties dialog box displayed in the second modified example.

FIG. 12 shows the main part of the Properties dialog box displayed by this modified dialog box display process executed in the second modified example. In the illustrated example, the first display field f21 and the third display field f23 are vacant in the paper output settings display box P3. In the structure of the first embodiment, the display fields f21 and f23 show the preset right of using allocated to General Manager and Sub-section Chief. When the user of the computer 10 is the Manager, the user can not select the paper output holders with the preset right of using allocated to the General Manager and Sub-section Chief. In the structure of the second modified example, the display fields f21 and f23 with the preset right of using allocated to General Manager and Sub-section Chief are vacant. This clearly shows the unavailability of these paper output holders. This arrangement thus enhances operability in data input.

The following describes a third modified example. The second modified example restricts the display of the display fields f21 through f31 based on the preset right of using each paper output holder. The third modified example, on the other hand, restricts the display of the display fields f21 through f31, based on the setting of the use as a sorter. As noted above with respect to FIG. 5, if the paper output holders are to operate as a sorter, in the example shown in FIG. 5 bin 4-bin 7 can provide that operation.

Figure 13:
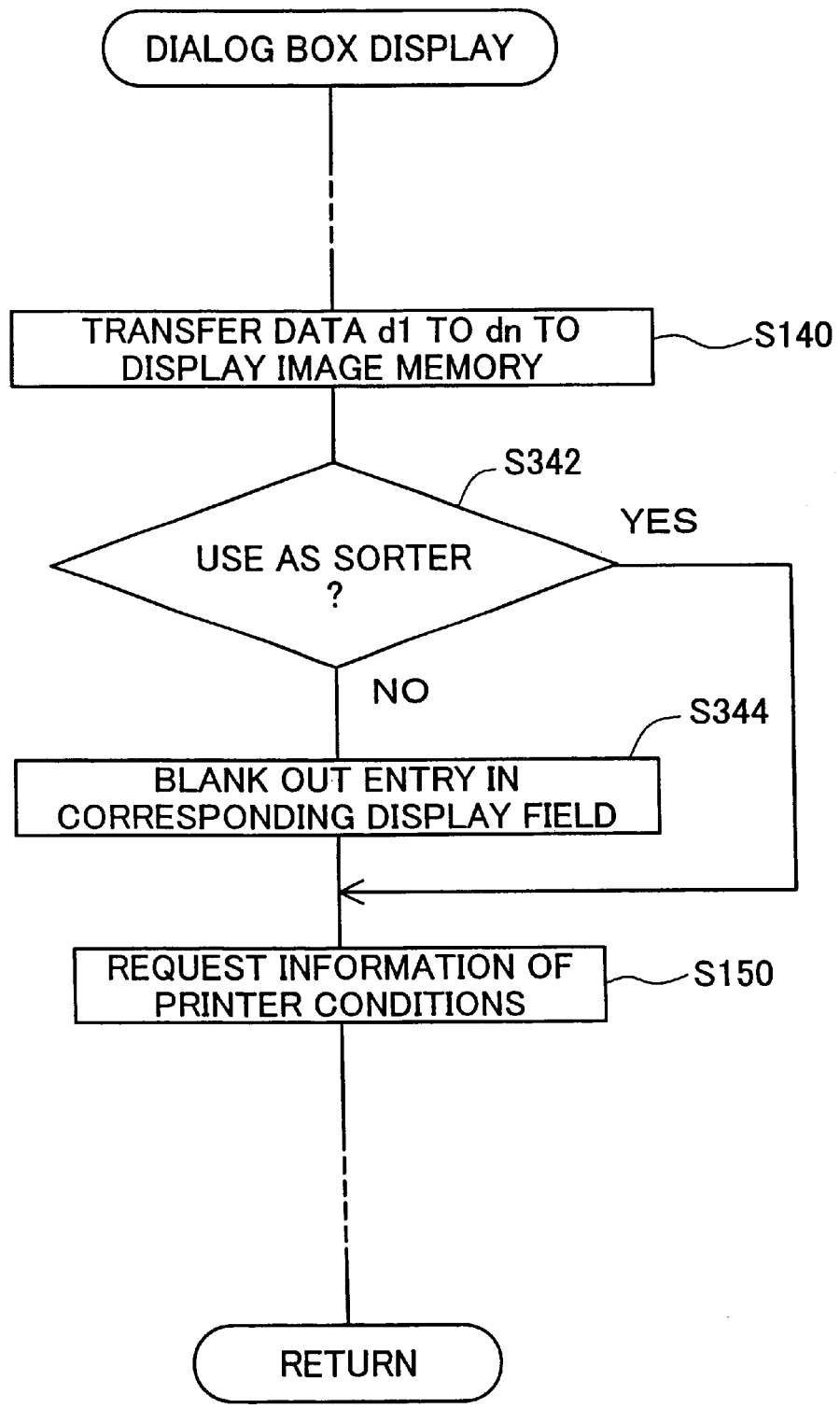
FIG. 13 is a flowchart showing the characteristic part of the dialog box display routine in a third modified example.

FIG. 13 is a flowchart showing the characteristic part of the dialog box display routine executed in the third modified example. When the program enters the routine, the CPU 30 carries out the same series of processing as that of the first embodiment up to step S140. The CPU 30 subsequently extracts the item corresponding to the attribute description areas a7 in the paper output settings display box P3 from the variety of data d1 through d7 read from the RAM 32, and determines whether or not the extracted data include the data requesting use of the paper output holders as a sorter (step S342). In the case of the negative answer (no in step S342), the CPU 30 blanks out any entry in the areas of the display fields f21 through f31 on the display image memory, to which the data representing the use as a sorter have been transferred (step S344). The program then proceeds to step S150 that is identical with the processing of the first embodiment.

In the case of the affirmative answer (yes) at step S342, on the other hand, the program skips the processing of step S344 and directly proceeds to step S150.

Figure 14:
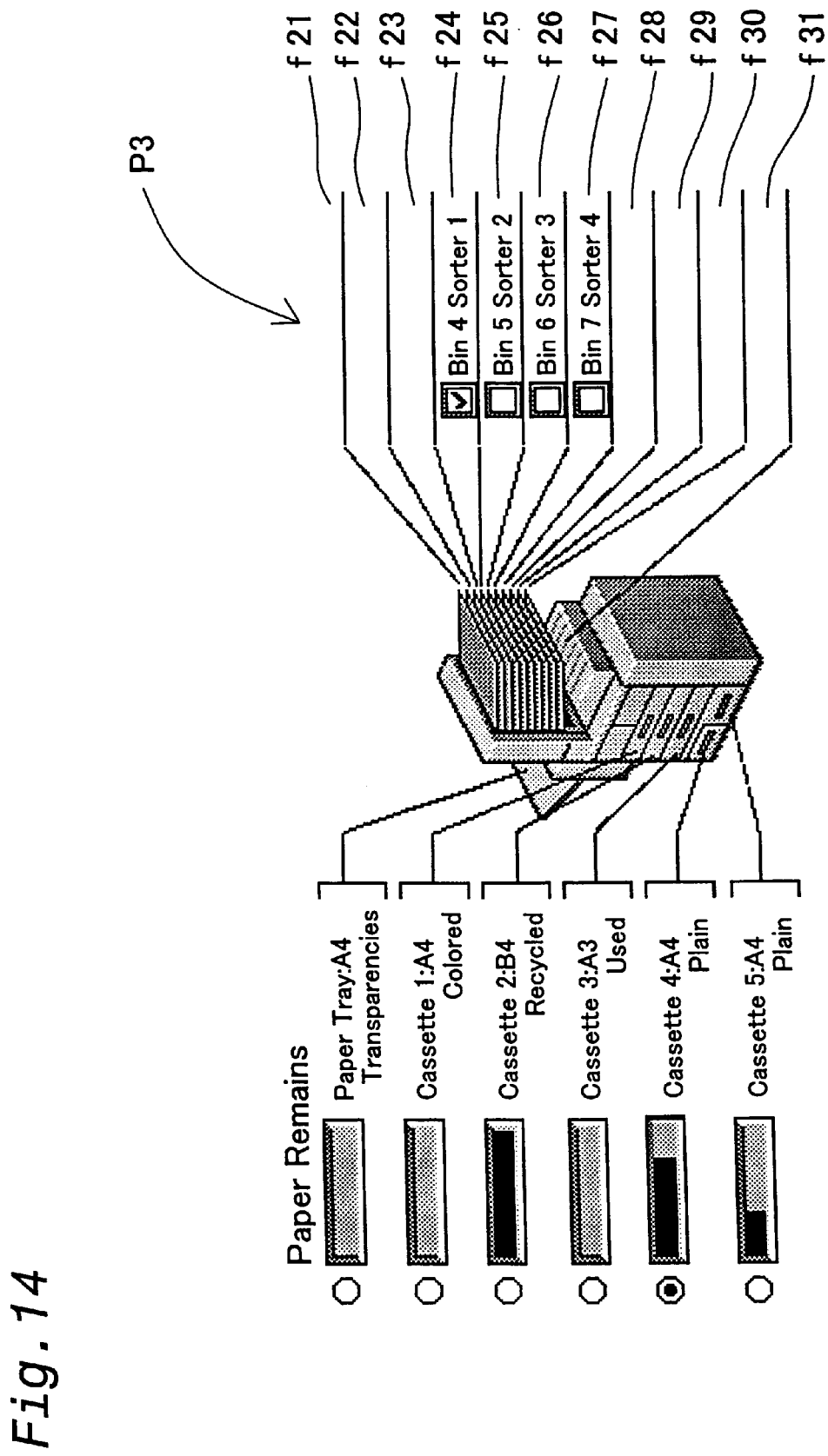
FIG. 14 shows the main part of the Properties dialog box displayed in the third modified example.

FIG. 14 shows the main part of the Properties dialog box displayed by this modified dialog box display process executed in the third modified example. In the illustrated example, all the display fields f21 through f23 and f28 through f31 other than the fourth through the seven display fields f24 through f27 with the display of the use as a sorter are vacant in the paper output settings display box P3.

In general, the paper output holders without the setting of the use as a sorter are not selectable as the destination of paper output. In the arrangement of the third modified example, the display fields f21 through f23 and f28 through f31 corresponding to the unavailable paper output holders without the setting of the use as a sorter are kept vacant. This clearly shows the unavailability of these paper output holders when sorting is desired. This arrangement enhances operability in data input.

The following describes a fourth modified example. The second modified example restricts the display of the display fields f21 through f31 based on the preset right of using each paper output holder, and the third modified example restricts the display of the display fields f21 through f31 based on the setting of the use as a sorter. The fourth modified example, on the other hand, restricts the display of the display fields f21 through f31 based on the preset paper type.

Figure 15:
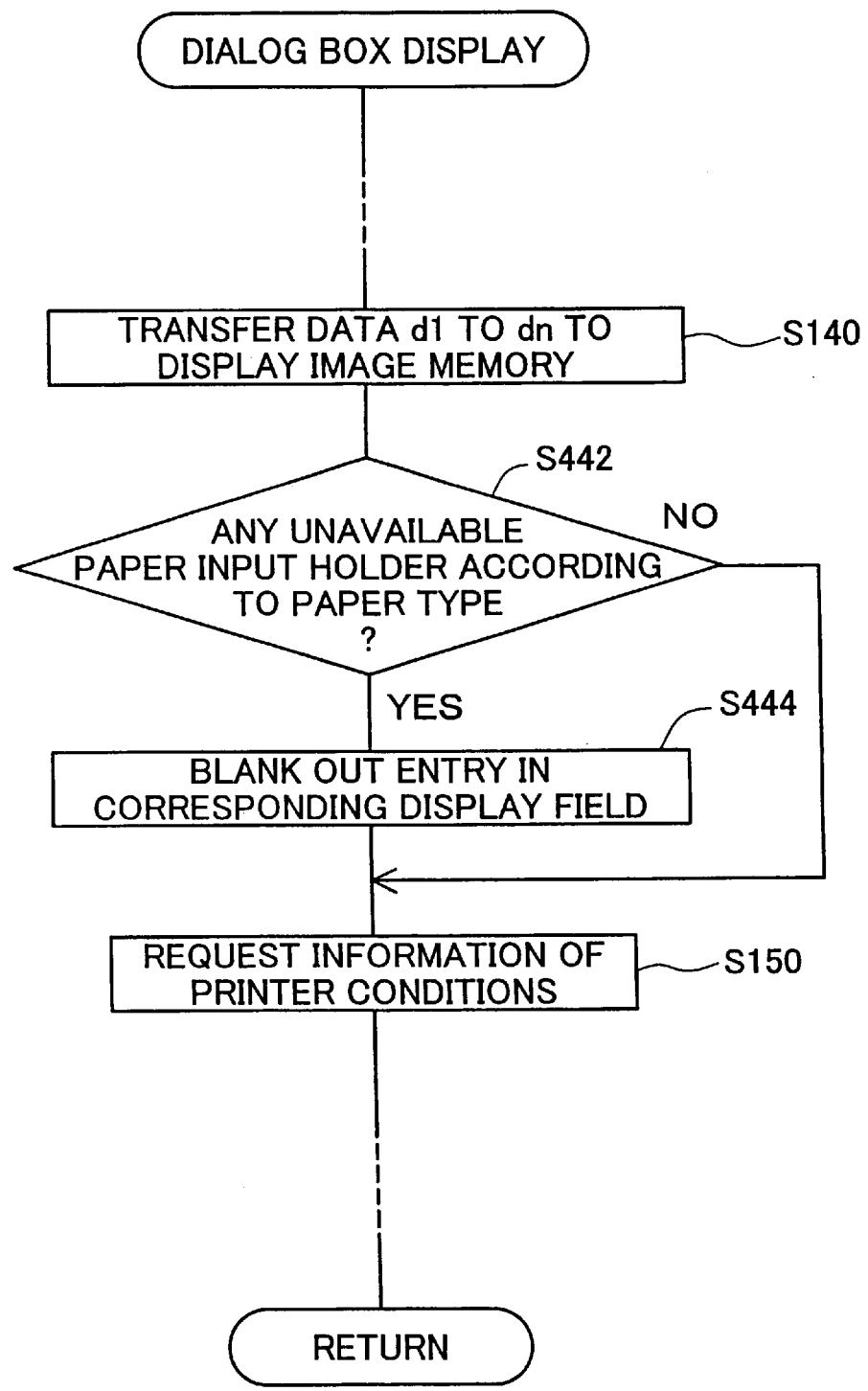
FIG. 15 is a flowchart showing the characteristic part of the dialog box display routine in a fourth modified example.

FIG. 15 is a flowchart showing the characteristic part of the dialog box display routine in the fourth modified example. When the program enters the routine, the CPU 30 carries out the same series of processing as that of the first embodiment up to step S140. The CPU 30 subsequently extracts the data representing the currently usable paper types from the variety of data d1 through d7 read from the RAM 32, and determines whether or not there are any unavailable paper output holders based on the data of the paper types (step S442). In the case of the affirmative answer (yes in step S442), the CPU 30 blanks out any entry in the areas of the display fields f21 through f31 on the display image memory corresponding to the unavailable paper output holders (step S444). The program then proceeds to step S150 that is identical with the processing of the first embodiment.

In the case of the negative answer (no) at step S442, on the other hand, the program skips the processing of step S344 and directly proceeds to step S150.

Figure 16:
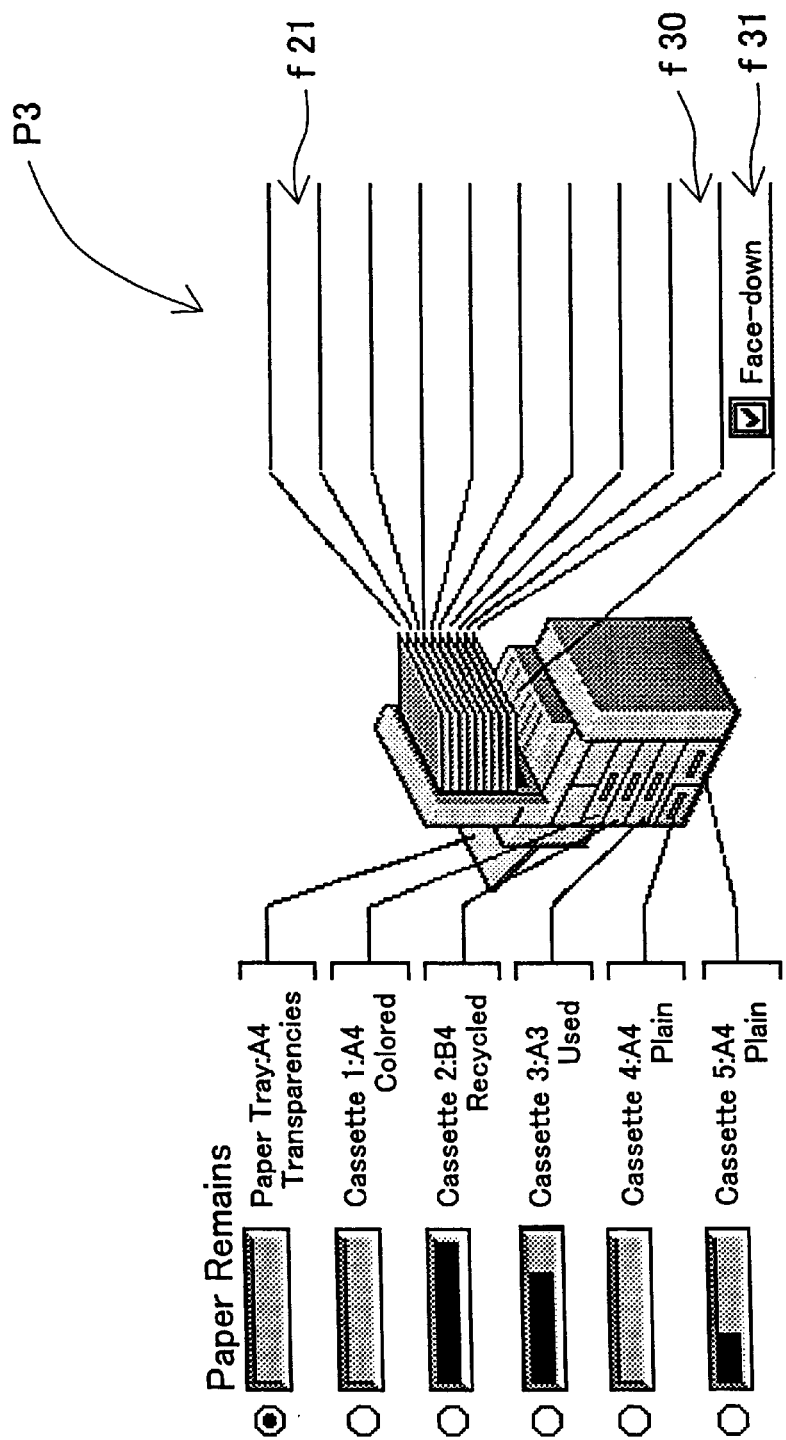
FIG. 16 shows the main part of the Properties dialog box displayed in the fourth modified example.

FIG. 16 shows the main part of the Properties dialog box displayed by this modified dialog box display process executed in the fourth modified example. In the illustrated example, when the Transparencies paper type is selected by clicking the radio button a1 in the first display field f11 of the paper input settings display box P2, the Transparencies paper can not be output to any of the ten bins of the multi-bin unit but should be output to the face-down tray. In the arrangement of the fourth modified example, all the display fields f21 through f30 other than the eleventh display field f31 corresponding to the face-down tray are kept vacant. This clearly shows the unavailability of any of the ten bins of the multi-bin unit when processing a transparency. This arrangement enhances operability in data input.

The second through the fourth modified examples keep the non-selectable areas of the display fields f21 through f31 according to the printing conditions vacant. These vacant spaces are not fixed according to the printing conditions. When specifying any of the vacant display fields as an effective destination of paper output, the user may restore the original entry of the vacant display field by a specific operation, for example, by clicking the vacant display field. This extends the area of the display in the display fields.

These modified examples restrict the display by making the corresponding display fields vacant. Another possible application restricts the display by graying down the display in the corresponding display fields.

The following describes a second embodiment of the present invention. The second embodiment has similar hardware and software configurations to those of the first embodiment, except the contents of the Properties dialog box displayed by the dialog box display process.

Figure 17:
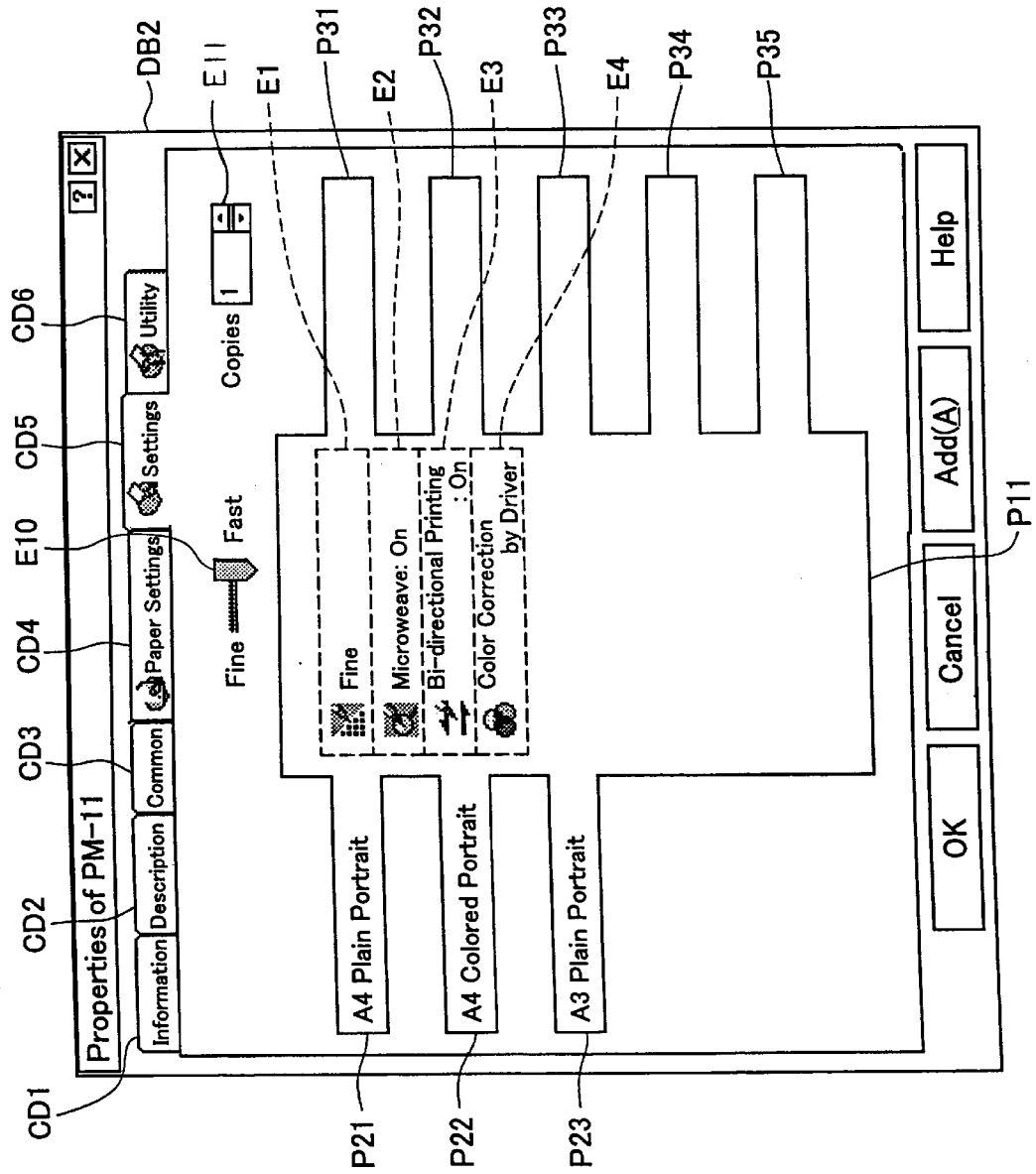
FIG. 17 shows a Properties dialog box DB2 in a second embodiment of the present invention.

FIG. 17 shows a Properties dialog box DB2 in this second embodiment. The dialog box DB2 is displayed by means of the printer driver of the second printer 120 (having the type name PR-11) connecting with the computer network 150. The Properties dialog box DB2 includes six cards of CD1 Information, CD2 Description, CD3 Common, CD4 Paper Settings, CD5 Settings, and CD6 Utility. One of the six cards CD1 through CD6 selected by the operator through operations of the mouse 20 is open and displayed in the dialog box DB1.

In the illustrated example of FIG. 17, the Settings card CD5 is open in the dialog box DB2. The Settings card CD5 in the dialog box DB2 includes a substantially rectangular figure P11 on the substantial center thereof. A plurality of (three in this example) wide rectangular figures P21, P22, and P23 are joined with the left side of the figure P11, whereas a plurality of (five in this example) wide rectangular figures P31, P32, P33, P34, and P35 are joined with the right side of the figure P11. The lines of the respective joints are omitted.

The figure P11 corresponds to the printer 110. The figures P21 through P23 correspond to three paper input holders set in the printer 110, and the figures P31 through P35 correspond to five paper output holders set in the printer 110. The detailed settings are displayable inside the figures P11 and P21 through P23.

Information regarding the basic settings, which affect the printing quality, is displayed inside the figure P11 corresponding to the printer 110 as mentioned above. More specifically information with regard to the Printing Quality, the Microweave, the Bi-directional Printing, and the Color Adjustment are displayed in display areas E1, E2, E3, and E4.

The Printing Quality represents the print resolution, and any one of Draft, Fine, and Superfine is displayed here. The Draft, Fine, and Superfine can respectively represent the print resolutions of 360×360 (dots), 720×360 (dots), and 720×720 (dots). The Microweave is one available function of the printer that allows a plurality of different heads to scan an identical line and create one identical dot in an overlapping manner for enhanced printing quality. The on-off state of this function is displayed here.

The Bi-directional Printing is another available function of the printer that allows a plurality of different heads to shift in opposing directions for the enhanced printing speed. The on-off state of this function is displayed here. The Color Adjustment specifies the information relating to the color correction. Any one of Color Correction by Driver, Video/Digital TV Camera Mode, and ICM is displayed here.

The information with regard to the Printing Quality, the Microweave, the Bi-directional Printing, and the Color Adjustment are set by sliding a slide lever E10 provided above the figure P11.

As shown in FIG. 17, the characteristics Fine and Fast are shown on either end of the slide lever E10. The operator drags the slide lever E10 with the mouse 20 to select either one of the characteristics Fine and Fast. The parameter values Fine and Fast given as the options of the slide lever E10 are used in the case of setting Plain to the data of the paper type. When other papers are set to the data of the paper type, an arbitrary two selected out of plural parameter values, such as Finer, Fine, Standard, Fast, are displayed. Here the parameter value Fast is one of the factors affecting the printing quality and represents the state of the high printing speed but a little poorer printing quality.

The parameter values Finer, Fine, Standard, and Fast determine the printing quality in a stepwise manner. In response to selection of one parameter value with the slide lever E10, the computer 10 carries out a series of processing to specify the Printing Quality, the Microweave, the Bi-directional Printing, and the Color Adjustment discussed above. The results of the specification are displayed in the display areas E1, E2, E3, and E4 inside the figure P11. When the operator clicks any one of the display areas E1, E2, E3, and E4 with the mouse open the corresponding pull-down menu including a plurality of options is opened. The user selects a desired option in the pull-down menu to modify the contents of each of the items Printing Quality, Microweave, Bi-directional Printing, and Color Adjustment.

Pieces of information with regard to Paper Size, Paper Type, and Orientation are displayed respectively inside the figures P21 through P23. The contents of the display may be modified in the Paper Settings card CD4. In the illustrated example, only the information regarding the Paper Size, the Paper Type, and the Orientation are shown inside the figures P21 through P23. As in the first embodiment, the display may include radio buttons to select one of the figures P21 through P23 as a desired paper input holder to be used.

The figures P31 through P35 correspond to the paper output holders as mentioned previously, and may include pieces of information with regard to the paper output. In the illustrated example, no information is specifically displayed inside these figures. As in the first embodiment, the display inside each figure may include the checkbox, the right of using allocated, for example, to General Manager or Manager, and the use as a sorter.

A data input box E11 for setting a number of copies is disposed above the figures P31 through P35.

The Properties dialog box having the specified contents is displayed by a dialog box display routine executed by the CPU 30. The dialog box display routine of the second embodiment is substantially similar to that of the first embodiment and is thus not specifically described here. The dialog box display process of the second embodiment displays the contents of the variable parts, which are specified from the various data stored by the processing up to the previous cycle, in addition to the base image data.

In the second embodiment having the above arrangement, the Properties dialog box DB2 is displayed. The Settings card of the dialog box DB1 includes the figure P11 corresponding to the printer, the figures P21 through P23 corresponding to the paper input holders, and the figures P31 through P35 corresponding to the paper output holders, which are displayed in a mutually correlated manner by their joints.

Unlike in the background art, this embodiment does not require the user to switch over the selected card when the user carries out both the settings of paper input and the settings of paper output. The correlation clarifies the flow in the series of processing; that is, the paper input, the printing operation, and the paper output. As a result, this arrangement enhances operability in data input.

In the arrangement of the second embodiment, the pieces of information regarding the basic settings that affect the printing quality are displayed inside the figure P11 representing the printer. This arrangement enables the user to readily check the information regarding the basic settings affecting the printing quality, thus enhancing operability in data input.

Any piece of the information with regard to the basic settings is selectable through the operations of the mouse 20. The required piece of the information may be modified in the corresponding pull-down menu displayed in response to the selection. This arrangement facilitates modification of the basic settings, thus enhancing operability in data input.

Figure 18:
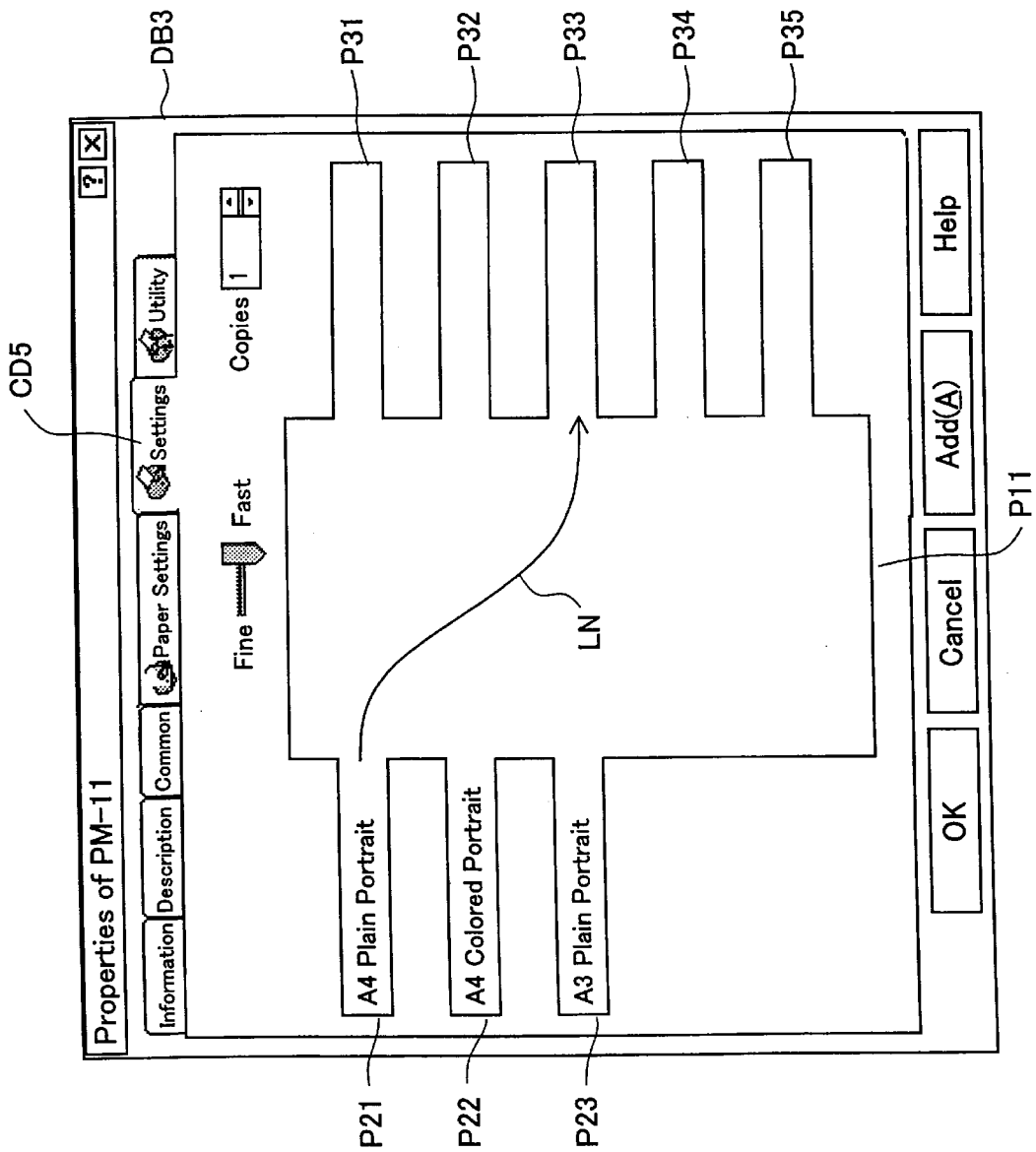
FIG. 18 shows a Properties dialog box DB3 in a modified example of the second embodiment.

One possible modification of the second embodiment is described below as another mode of carrying out the present invention. FIG. 18 shows a Properties dialog box DB3 in a modified example of the second embodiment. A Settings card CD5 of this dialog box DB3 includes the figures P11, P21 through P23, and P31 through P35 that are substantially similar to those of the second embodiment. The difference from the second embodiment is the contents of the display inside the figure P11 representing the printer.

In this modified example, a paper feeding path in the course of printing by the printer is displayed inside the figure P11 as an arrowed line LN. The display connects a selected paper input holder with a selected paper output holder by the arrowed line LN.

The arrangement of this modified example enables the user to readily check, the paper input holder used, the destination of paper output, and the paper feeding path in the course of printing by the printer.

The arrangement of this modified example shows the paper path by the arrowed line. Another possible application may display the paper path by an animation image where the paper is successively fed.

Figure 19:
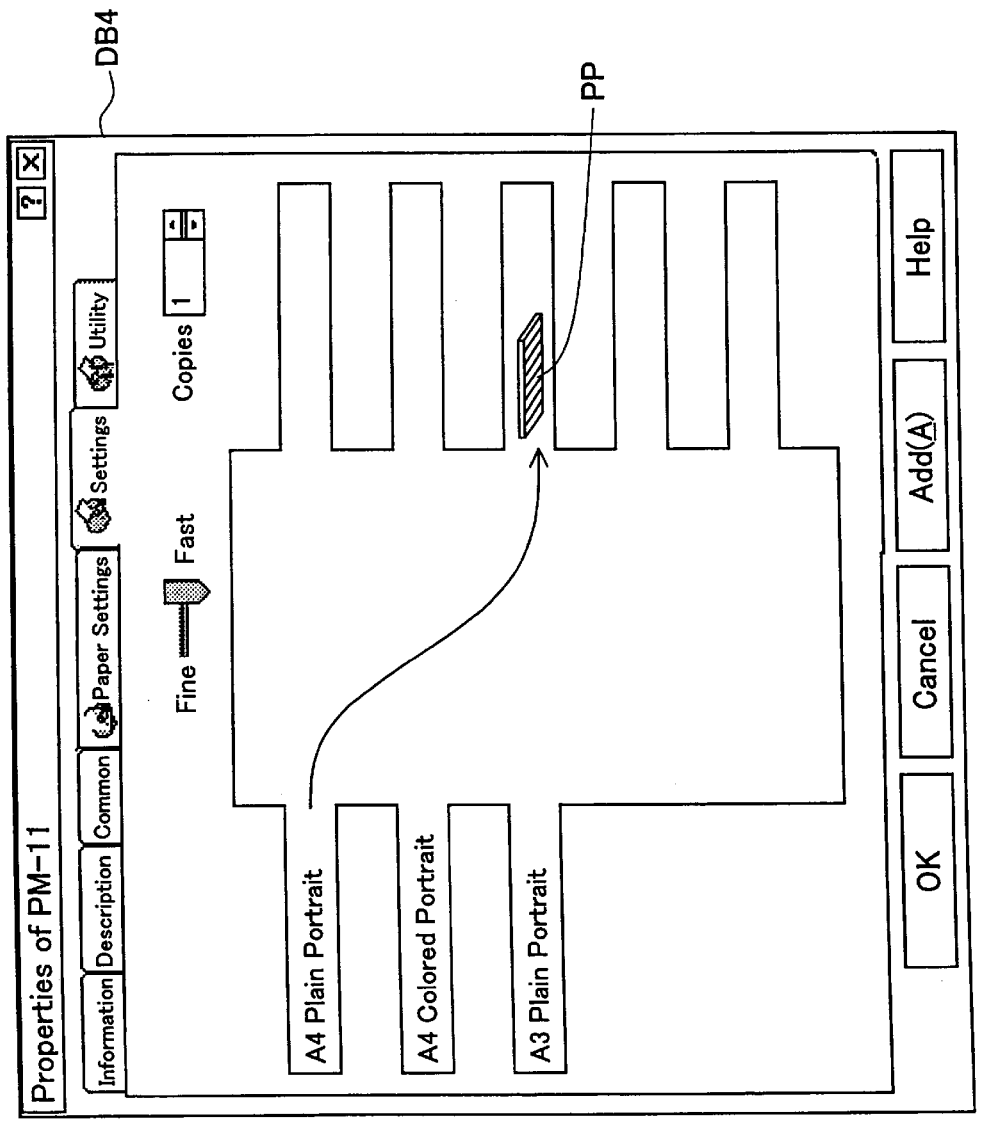
FIG. 19 shows a dialog box DB4 as an example of displaying the face up-down state of the output paper.

Another possible modification displays the face up-down state of the output paper. FIG. 19 shows a dialog box DB4 as an example of displaying the face up-down state of the output paper. In the illustrated example, an image PP of paper having a hatched face is displayed. The hatched face represents the surface of paper with a document written thereon. The arrangement of this modified example enables the user to readily check the face up-down state of the output paper.

In the specification hereof, the term "printing device" is not restricted to the printers but includes facsimiles, copying machines, word processors, etc. Namely the principle of the present invention is applicable to a diversity of printing devices, such as facsimiles, copying machines, word processors, as well as printers, etc., as long as the printing device carries out printing with the functions of paper input and paper output.

The technique of the present invention is applicable to the printing-related information setting apparatus that sets various pieces of information required for printing by a diversity of printing devices including printers, facsimiles, copying machines, and word processors.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A printing-related information setting apparatus that includes a display unit and an input unit and sets various information with regard to printing by a predetermined printing device, based on input data from the input unit according to contents of a screen display area displayed for data input on the display unit, said printing-related information setting apparatus comprising:
   a display control unit configured to display a printing device image representing said printing device, a paper input settings display box showing information relating to paper input to said printing device, and a paper output settings display box showing information relating to paper output from said printing device, on a same menu in the screen display area, wherein said display control unit further comprises:
   a paper holder display unit that displays, as a menu, a plurality of field images respectively representing a plurality of paper holders that are set in said printing device in said paper input settings display box, each of said field images respectively including an actuator, each actuator arranged to select a paper holder represented by said respective field image when said actuator is selected by a user;
   a paper holder links parts display unit that display links parts linking each of said plurality of field images displayed in said paper holder display unit to a corresponding part of said printing device image;
   a paper bin display unit that displays, as a menu, a plurality of field images respectively representing a plurality of paper bins that are set in said printing device in said paper output settings display box, each of said field images respectively including an actuator, each actuator arranged to select a paper bin represented by said respective field image when said actuator is selected by a user; and
   a paper bin links parts display unit that displays links parts linking each of said plurality of field images displayed in said paper bin display unit to a corresponding part of said printing device image.

2. A printing-related information setting apparatus in accordance with claim 1, wherein said display control unit further comprises:
   a controller configured to cause an icon showing an appearance of said printing device to be displayed as the printing device image.

3. A printing-related information setting apparatus in accordance with claim 1, wherein said display control unit further comprises:
   a controller configured to locate the paper input settings display box on one side of the printing device image and to locate the paper output settings display on the other side of the printing device image.

4. A printing-related information setting apparatus in accordance with any one of claims 1 through 3, wherein said paper holders links parts display unit and said paper bins links parts display unit are configured to link said paper holders and bins with lines to the printing device.

5. A printing-related information setting apparatus in accordance with claim 1, wherein said display control unit further comprises:
   a paper input display unit configured to cause a plurality of field images corresponding to a plurality of input paper holders set in said printing device to be displayed in the paper input settings display box; and a paper input distinguishable display unit configured to cause a specific field image representing an available input paper holder currently usable in said printing device among the plurality of field images displayed by said paper input display unit to be displayed in a distinguishable manner from field images representing other input paper holders.

6. A printing-related information setting apparatus in accordance with claim 5, further comprising:

an input paper holder selection unit that is provided for each of the field images displayed by said display unit and configured to select one out of the plurality of field images displayed as a means by said paper input display unit, based on the input data from said input unit; and an input paper holder setting unit configured to set an input paper holder represented by the selected field image as the available input paper holder currently usable in said printing device.

7. A printing-related information setting apparatus in accordance with claim 1, further comprising:

a residual paper quantity-related information input unit configured to receive information regarding a residual quantity of paper of each of the paper holders from said printing device, and wherein said display control unit comprises a residual paper quantity display unit configured to cause the residual quantity of paper of each of the paper holders to be displayed at the position of each of the field images representing paper holders, based on the received information.

8. A printing-related information setting apparatus in accordance with claim 1, further comprising:

an output paper remaining-related information input unit configured to receive information regarding an output paper remaining state of each of the paper holders from said printing device, and wherein said display control unit comprises an output paper remains-related information display unit configured to cause the output paper of each of the paper holders remaining state to be displayed at the position of each of the field images representing paper holders, based on the received information.

9. A printing-related information setting apparatus in accordance with claim 1, further comprising:

a paper output distinguishable display unit configured to cause a specific field image representing an available output paper holder currently usable in said printing device among the plurality of field images displayed by paper output display unit to be displayed in a distinguishable manner from field images representing other output paper holders.

10. A printing-related information setting apparatus in accordance with claim 9, further comprising:

an output paper holder selection unit that is provided for each of the field images displayed by said paper output display unit and configured to select at least one out of the plurality of field images displayed as a menu by said paper output display unit, based on the input data from said input unit; and an output paper holder setting unit configured to set an output paper holder represented by the selected at least one field image as the available output paper holder currently usable in said printing device.

11. A printing-related information setting apparatus in accordance with any one of claims 9 through 10, further comprising:

a use allocation unit configured to individually allocate the right of using to the plurality of output paper holders, wherein said display control unit comprises a controller configured to cause said paper output display unit to display the plurality of field images corresponding to the plurality of output paper holders together with use information regarding the right of using individually allocated of the plurality of output paper holders.

12. A printing-related information setting apparatus in accordance with any one of claims 9 through 10, further comprising:

a sorter allocation unit configured to allocate use as a sorter to multiple output paper holders, which are selected among the plurality of output paper holders, wherein said display control unit comprises a controller configured to cause field images representing the multiple output paper holders with the allocated use as the sorter by said sorter allocation unit to be displayed together with information regarding the use as the sorter.

13. A printing-related information setting apparatus in accordance with claim 1, further comprising:

an available output paper holder specification unit configured to specify an available output paper holder out of the plurality of output paper holders, based on a printing condition; and a restrictive display unit configured to restrict the display by said paper output display unit to display only a specific field image representing the specified available output paper holder.

14. A printing-related information setting apparatus in accordance with claim 13, further comprising:

a use allocation unit configured to individually allocate the right of using to the plurality of output paper holders, wherein said available output paper holder specification unit sets the allocated right of using as the printing condition.

15. A printing-related information setting apparatus in accordance with claim 13, further comprising:

a sorter allocation unit configured to allocate use as a sorter to multiply output paper holders, which are selected among the plurality of output paper holders, wherein said available output paper holder specification unit sets the allocated use as the sorter as the printing condition.

16. The printing-related information setting apparatus in accordance with claim 13, further comprising:

a specification unit configured to specify a type of paper fed to said printing device, wherein said available output paper holder specification unit sets the specified type of paper as the printing condition.

17. A printing-related information setting apparatus is accordance with claim 1, further comprising:

a working state-related information input unit configured to receive information regarding a working state of said printing device; and a working state display unit configured to cause the working state to be displayed in the screen display area, based on the received information.

18. A printing-related information setting apparatus in accordance with claim 1, further comprising:

a residual expendable quantity-related information input unit configured to receive information regarding a residual quantity of an expendable supply from said printing device; and a residual expendable quantity display unit configured to cause the residual quantity of the expendable supply to be displayed in the screen display area, based on the received information.

19. A printing-related information setting apparatus in accordance with claim 1, wherein said display control unit comprises a basic settings-related information display control unit configured to cause information regarding basic settings, which affect a printing quality, to be displayed at a position of the printing device image.

20. A printing-related information setting apparatus in accordance with claim 19, further comprising:

an information display control unit configured to make the information displayed by said basic settings-related information display control unit selectable through an operation using said input unit and, when the information is selected, enables the selected information to be modified.

21. A printing-related information setting apparatus in accordance with claim 1, wherein said display control unit comprises a paper path display unit configured to cause an image representing a paper feeding path in the course of printing by said printing device to be displayed at a position of the printing device image.

22. A method of setting various information with regard to printing by a predetermined printing device, based on input data from an input unit according to contents of a same menu of a screen display area displayed for data input on a display unit, comprising the step of:

causing a printing device image representing said printing device, a paper input settings display box showing information relating to paper input to said printing device, and a paper output settings display box showing information relating to paper output from said printing device to be displayed separately in the same menu of the screen display area; and said display control unit further comprises:

causing a paper holder display unit to be displayed, configured to display as a menu, a plurality of field images respectively representing a plurality of paper holders that are set in said printing device in said paper input settings display box, each of said field images respectively including an actuator, each actuator arranged to select a paper holder represented by said respective field image when said actuator is selected by a user;

causing a paper holder links parts display unit to be displayed, configured to display links parts linking each of said plurality of field images displayed in said paper holder display unit to a corresponding part of said printing device image;

causing a paper bin display unit to be displayed, configured to selectably display as a menu, a plurality of field images respectively representing a plurality of paper bins that are set in said printing device in said paper output settings display box, each of said field images respectively including an actuator, each actuator arranged to select a paper bin represented by said respective field image when said actuator is selected by a user; and causing a paper bins links parts display unit to be displayed, configured to display links parts linking each of said plurality of field images displayed in said paper bin display unit to a corresponding part of said printing device image.

23. A method in accordance with claim 22, wherein said step of causing a printing device image to be displayed further comprises the step of:

causing an icon showing an appearance of said printing device to be displayed as the printing device image.

24. A method in accordance with claim 22, wherein said step of causing a printing device image to be displayed further comprises:

the step of locating the paper input settings display box on one side of the printing device image and locating the paper output settings display box on the other side of the printing device image.

25. A method in accordance with any one of claims 22 through 24, wherein said step of causing a printing device image to be displayed further comprises the step of:

causing a line relating the printer image unit to the paper input settings display box and a line relating the printer image unit to the paper output settings display box to be displayed in the screen display area.

26. A computer-readable recording medium, in which a computer program is recorded to set various information with regard to printing by a predetermined printing device, based on input data from an input unit according to contents of a same menu of a screen display area displayed for data input on a display unit, said computer program causing a computer to attain the function of:

causing a printing device image representing said printing device, a paper input settings display box showing information relating to paper input to said printing device, and a paper output settings display box showing information relating to paper output from said printing device to be displayed separately in the same menu of the screen display area;

causing a paper holder display unit to be displayed, configured to display as a menu, a plurality of field images respectively representing a plurality of paper holders that are set in said printing device in said paper input settings display box, each of said field images respectively including an actuator, each actuator arranged to select a paper holder represented by said respective field image when said actuator is selected by a user;

causing a paper holder links parts display unit to be displayed, configured to display links parts linking each of said plurality of field images displayed in said paper holder display unit to a corresponding part of said printing device image;

causing a paper bin display unit to be displayed, configured to selectably display as a menu, a plurality of field images respectively representing a plurality of paper bins that are set in said printing device in said paper output settings display box, each of said field images respectively including an actuator, each actuator arranged to select a paper bin represented by said respective field image when said actuator is selected by a user; and causing a paper bins links parts display unit to be displayed, configured to display links parts linking each of said plurality of field images displayed in said paper bin display unit to a corresponding part of said printing device image.

* * * * *